US010732737B2

(12) United States Patent
You et al.

(10) Patent No.: US 10,732,737 B2
(45) Date of Patent: Aug. 4, 2020

(54) METHOD AND APPARATUS FOR ADAPTIVELY PROVIDING INDICATION ASSOCIATED WITH INPUT IN VEHICLE

(71) Applicant: Samsung Electronics Co., Ltd., Suwon-si, Gyeonggi-do (KR)

(72) Inventors: Juyeon You, Yongin-si (KR); Kyu-Sung Kim, Seoul (KR); Sungkwon Kim, Seoul (KR); Sungwook Lee, Seoul (KR); Yongjun Lim, Seoul (KR); Jaemo Choi, Hwaseong-si (KR); Donghee Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/198,226

(22) Filed: Nov. 21, 2018

(65) Prior Publication Data
US 2019/0163288 A1 May 30, 2019

(30) Foreign Application Priority Data
Nov. 29, 2017 (KR) .................. 10-2017-0162229

(51) Int. Cl.
G06F 3/0362 (2013.01)
G06F 3/01 (2006.01)
(Continued)

(52) U.S. Cl.
CPC ............ G06F 3/0362 (2013.01); B60K 35/00 (2013.01); B60K 37/06 (2013.01); G06F 3/016 (2013.01);
(Continued)

(58) Field of Classification Search
CPC .... G06F 3/0362; G06F 3/016; G06F 3/01423; B60K 37/06; B60K 2370/10–149; B60K 2370/152–1537
See application file for complete search history.

(56) References Cited

U.S. PATENT DOCUMENTS 9,696,542 B2 7/2017 Kim et al.
2006/0092130 A1 5/2006 Choquet et al.
(Continued)

FOREIGN PATENT DOCUMENTS

GB 2494420 A 3/2013
KR 10-2013-0118543 A 10/2013
(Continued)

OTHER PUBLICATIONS

International Search Report dated Mar. 5, 2019 issued in International Application No. PCT/KR2018/014410.
(Continued)

Primary Examiner — Michael Pervan
(74) Attorney, Agent, or Firm — Jefferson IP Law, LLP

(57) ABSTRACT

An electronic device attachable to a vehicle may include an interface, an input device is provided. The electronic device includes a display, and a processor configured to detect that a context related to the vehicle corresponds to a first context based on first information received via the interface, in response to the detection that the context related to the vehicle corresponds to the first context, display a first indication indicating a first function corresponding to the first context from among a plurality of functions of the vehicle, which are controllable by the input device, while displaying the first indication, detect that the context related to the vehicle changed from the first context to a second context based on second information received via the interface, and based on the detection, display a second indication
(Continued)

which is changed from the first indication and indicates a second function corresponding to the second context.

20 Claims, 33 Drawing Sheets

(51) Int. Cl.
  *B60K 37/06* (2006.01)
  *B60K 35/00* (2006.01)
  *G06F 3/14* (2006.01)
(52) U.S. Cl.
  CPC ........ *G06F 3/1423* (2013.01); *B60K 2370/11* (2019.05); *B60K 2370/111* (2019.05); *B60K 2370/113* (2019.05); *B60K 2370/115* (2019.05); *B60K 2370/12* (2019.05); *B60K 2370/122* (2019.05); *B60K 2370/126* (2019.05); *B60K 2370/128* (2019.05); *B60K 2370/1438* (2019.05); *B60K 2370/1468* (2019.05); *B60K 2370/15* (2019.05); *B60K 2370/152* (2019.05); *B60K 2370/158* (2019.05); *B60K 2370/1537* (2019.05); *B60K 2370/166* (2019.05); *B60K 2370/184* (2019.05); *B60K 2370/186* (2019.05); *B60K 2370/1868* (2019.05); *B60K 2370/52* (2019.05)

(56) References Cited

U.S. PATENT DOCUMENTS

| | | |
|---|---|---|
| 2013/0120129 A1 | 5/2013 | Tippelhofer et al. |
| 2014/0215403 A1 | 7/2014 | Wengelnik et al. |
| 2015/0344059 A1 | 12/2015 | Kim et al. |
| 2015/0355731 A1 | 12/2015 | Tanaka |
| 2017/0255280 A1 | 9/2017 | Pacsai et al. |
| 2018/0107320 A1* | 4/2018 | Im .................. B60K 35/00 |
| 2018/0154774 A1* | 6/2018 | Park ............... G06F 3/04847 |
| 2018/0370365 A1* | 12/2018 | Lee ................. B60K 37/02 |

FOREIGN PATENT DOCUMENTS

| | | |
|---|---|---|
| KR | 10-2015-0059495 A | 6/2015 |
| KR | 10-2015-0131399 A | 11/2015 |
| KR | 10-2017-0035145 A | 3/2017 |
| WO | 2016/182159 A1 | 11/2016 |

OTHER PUBLICATIONS

European Search Report dated Jan. 25, 2019, in the European Application No. 18208882.3.
European Office Action dated Apr. 1, 2020, issued in European Patent Application No. 18 208 882.3.

* cited by examiner

METHOD AND APPARATUS FOR ADAPTIVELY PROVIDING INDICATION ASSOCIATED WITH INPUT IN VEHICLE

CROSS-REFERENCE TO RELATED APPLICATION(S)

This application is based on and claims priority under 35 U.S.C. § 119(a) of a Korean patent application number 10-2017-0162229, filed on Nov. 29, 2017, in the Korean Intellectual Property Office, the disclosure of which is incorporated by reference herein in its entirety.

BACKGROUND

1) Field

The disclosure relates to a method and apparatus for adaptively providing an indication related to an input in a vehicle.

2) Description of the Related Art

The above information is presented as background information only to assist with an understanding of the disclosure. No determination has been made, and no assertion is made, as to whether any of the above might be applicable as prior art with regard to the disclosure.

As development of electronics has progressed, various electronic devices have been installed in a vehicle. The electronic devices may provide various functions or various services to a user who is in the vehicle.

SUMMARY

Aspects of the disclosure are to address at least the above-mentioned problems and/or disadvantages and to provide at least the advantages described below. Accordingly, an aspect of the disclosure is to provide an Additional aspects will be set forth in part in the description which follows and, in part, will be apparent from the description, or may be learned by practice of the presented embodiments.

Various electronic devices which provide various functions are installed in a vehicle, and various types of inputs for the various functions may be required in the vehicle. The various types of inputs while a driver drives a vehicle may be a cause of the increased occurrence of accidents. Therefore, there is a desire for a solution to simplify the various types of inputs required during driving.

Various embodiments may provide a method and apparatus for adaptively providing an indication related to an input, so as to control the various functions using simplified inputs during driving.

The technical subjects pursued in the disclosure may not be limited to the above mentioned technical subjects, and other technical subjects which are not mentioned may be clearly understood, through the following descriptions, by those skilled in the art of the disclosure.

An electronic device attachable to a vehicle according to various embodiments may include an interface, an input device comprising a display, and a processor, wherein the processor is configured to detect that a context related to the vehicle corresponds to a first context based on first information received via the interface, in response to the detection that the context related to the vehicle corresponds to the first context, display, on the display, a first indication indicating a first function corresponding to the first context from among a plurality of functions of the vehicle, which are controllable by the input device, while displaying the first indication, detect that the context related to the vehicle is changed from the first context to a second context based on second information received via the interface, and based on the detection that the context related to the vehicle is changed to the second context, display, on the display, a second indication which is changed from the first indication and indicates a second function corresponding to the second context from among the plurality of functions.

An input device attachable to a vehicle according to various embodiments may comprise a housing comprising a first surface, a display exposed via at least a part of the first surface, and a control circuitry, and a rotatable structure mounted on at least a part of the first surface, and configured to enclose the display when the first surface is viewed from a top, wherein the control circuitry is configured to receive, from a control device attached to the vehicle, configuration information including data indicating a function of the vehicle corresponding to a context related to the vehicle which is detected by the control device, map, to the input device, the function from among a plurality of functions controllable by the input device, based on the configuration information, and in response to detecting a rotational input on the rotatable structure while displaying the indication in a state in which the function is mapped to the input device, transmit, to the control device, information associated with the rotational input to the control device.

A method of an electronic device attachable to a vehicle according to various embodiments may comprise detecting that a context related to the vehicle corresponds to a first context based on first information received via an interface of the electronic device, in response to detecting that the context related to the vehicle corresponds to the first context, displaying, on a display of an input device, a first indication indicating a first function corresponding to the first context from among a plurality of functions of the vehicle, which are controllable by the input device, while displaying the first indication, detecting that the context related to the vehicle is changed from the first context to a second context based on second information received via the interface, and based on the detection that the context related to the vehicle is changed to the second context, displaying, on the display, a second indication which is changed from the first indication and indicates a second function corresponding to the second context from among the plurality of functions.

A non-transitory computer readable recording medium according to various embodiments may store one or more programs for implementing operations, the operations comprising detecting that a context related to a vehicle corresponds to a first context based on first information received via an interface of an electronic device attachable to the vehicle, in response to detecting that the context related to the vehicle corresponds to the first context, displaying, on a display of an input device, a first indication indicating a first function corresponding to the first context from among a plurality of functions of the vehicle, which are controllable by the input device of the electronic device, while displaying the first indication, detecting that the context related to the vehicle is changed from the first context to a second context based on second information received via the interface, and based on the detection that the context related to the vehicle is changed to the second context, displaying, on the display, a second indication which is changed from the first indication and indicates a second function corresponding to the second context from among the plurality of functions.

A method and apparatus according to various embodiments may provide a plurality of functions of a vehicle using a simplified input, by using an input device that displays indication that is changed based on a context related to the vehicle.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Figure 1:
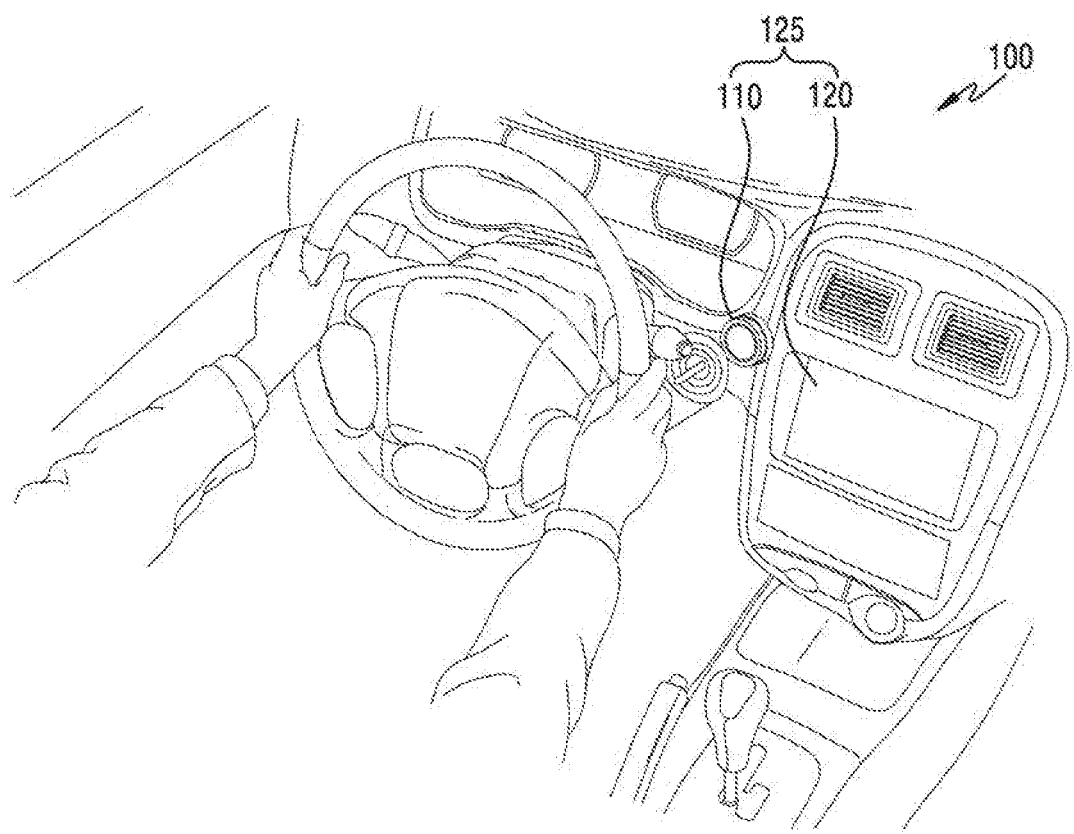
FIG. 1 is a diagram illustrating an example of an in-vehicle environment including an input device and a control device according to various embodiments of the disclosure.

FIG. 1 is a diagram illustrating an example of an in-vehicle environment including an input device and a control device according to various embodiments of the disclosure.

Referring to FIG. 1, an in-vehicle environment 100 may include an input device 110 and a control device 120.

The input device 110 may be used for receiving an input from a user located in the in-vehicle environment 100. According to various embodiments, the input device 110 may be disposed in a partial area of a dashboard in the environment 100, so as to receive an input from a user located in the environment 100. For example, the input device 110 may be disposed in an area where a center fascia is located in the dashboard in the environment 100 or an area around the center fascia, so as to control a predetermined function of the vehicle via the input device 110 in the state in which the user sits in a driver's seat (or passenger seat) in the environment 100. However, the location where the input device 110 is disposed in the environment 100 is not limited thereto.

The input device 110 may include a housing and a rotatable structure.

According to various embodiments, the housing may include a first surface, a display exposed via at least a part of the first surface, and a control circuitry.

The first surface may face a user who is located in a driver's seat or a passenger's seat. The first surface may face the rear of the vehicle.

The display may display an indication indicating one of a plurality of functions of the vehicle which are controllable via the input device 110. The display may display an indication for indicating a function currently mapped to the input device 110 from among the plurality of functions of the vehicle which are controllable by the input device 110. For example, the indication may be used to indicate at least one from among a function related to an emergency call, a function related to an incoming call, a function related to message reception, a function related to an alarm or a notification, a function related to navigation, a function related to providing weather information, a function related to volume control, a function related to a clock, a function related to wind direction control, a function related to temperature, a function related to wind speed, a function related to removal of humidity, a function related to a driving mode of a vehicle, a function related to opening and shutting of the gas cap of a vehicle, a function related to opening and shutting of a window of a vehicle, and a function related to a voice recognition service. For example, the indication may indicate a function that is currently provided in the input device 110 from among the plurality of functions.

The display may display information for indicating how the function mapped to the input device 110 from among the plurality of functions is to be controlled. For example, the display may display information for indicating a wind speed level to be provided via an air-conditioner of the vehicle, based on detection of an input for controlling a wind speed.

According to various embodiments, the housing may be configured to detect a depression on at least a part of the first surface. For example, the housing may linearly move in a direction that is vertical to the first surface, based on a click input caused by a user. As another example, the housing may detect a force touch on the display via a pressure sensor contained in the housing.

The control circuitry may be used to control a plurality of components (e.g., a display or the like) included in the input device 110. According to various embodiments, based on information received from electronic devices in the vehicle, such as the control device 120, the control circuitry may control displaying of the indication or the information on the display. The control circuitry may control detection of various types of inputs to input device 110.

The rotatable structure may be mounted on at least a part of the first surface. The rotatable structure may be configured to enclose the display when the first surface is viewed from a top. The rotatable structure may be configured in a ring shape or may be configured in a ring shape including a plurality of grooves. The rotatable structure may be configured to detect a rotational input to the input device 110.

The control device 120 may be configured to control a plurality of components in the environment 100.

According to various embodiments, the control device 120 may control a device related to providing the wind speed of the air conditioner (or a heater) in the environment 100 or a device related to providing the wind direction of the air conditioner (or a heater) in the environment 100. For example, the control device 120 may change a wind speed or a wind direction via the device, based on an input detected via an input unit in the environment 100, such as the input device 110.

According to various embodiments, the control device 120 may control a display in the environment 100. For example, the control device 120 may display a user interface for providing a navigation service on the display. As another example, the control device 120 may display a user interface for providing a content such as music, video, or the like, on the display.

According to various embodiments, the control device 120 may control a device related to a communication function in the environment 100. For example, the control device 120 may transmit an emergency call or an outgoing call via the device, or may receive an incoming call via the device.

According to various embodiments, the control device 120 may control a device related to an audio function in the environment 100. For example, the control device 120 may output music via a speaker.

According to various embodiments, the control device 120 may control sensor devices embedded in the environment 100. For example, the control device 120 may activate a front camera or a back camera based on the state of a vehicle. As another example, the control device 120 may control operation of a plurality of sensors for an advanced driver assistance system (ADAS).

According to various embodiments, the control device 120 may control the input device 110 in the environment 100. For example, the control device 120 may provide information to the input device 110. As another example, the control device 120 may obtain information from the input device 110.

According to various embodiments, the input device 110 and the control device 120 may be independent apparatuses.

According to various embodiments, the input device 110 and the control device 120 may be implemented as a single electronic device 125.

The input device 110 according to various embodiments to be described may select one of a plurality of functions based on information obtained from the control device 120. Through the selection, the input device 110 may provide a function that is changed adaptively based on a change in a context related to the environment 100. The input device 110 may provide a user with convenience, intuitiveness, or enhanced user experience (UX) via the adaptive function provision.

The input device 110 according to various embodiments to be described may detect an input related to the function, and may provide information associated with the detected input to the control device 120. The input may be simplified due to the structural characteristics of the input device 110. The input device 110 may provide a user with convenience, intuitiveness, or enhanced user experience via the simplified input.

Figure 2A:
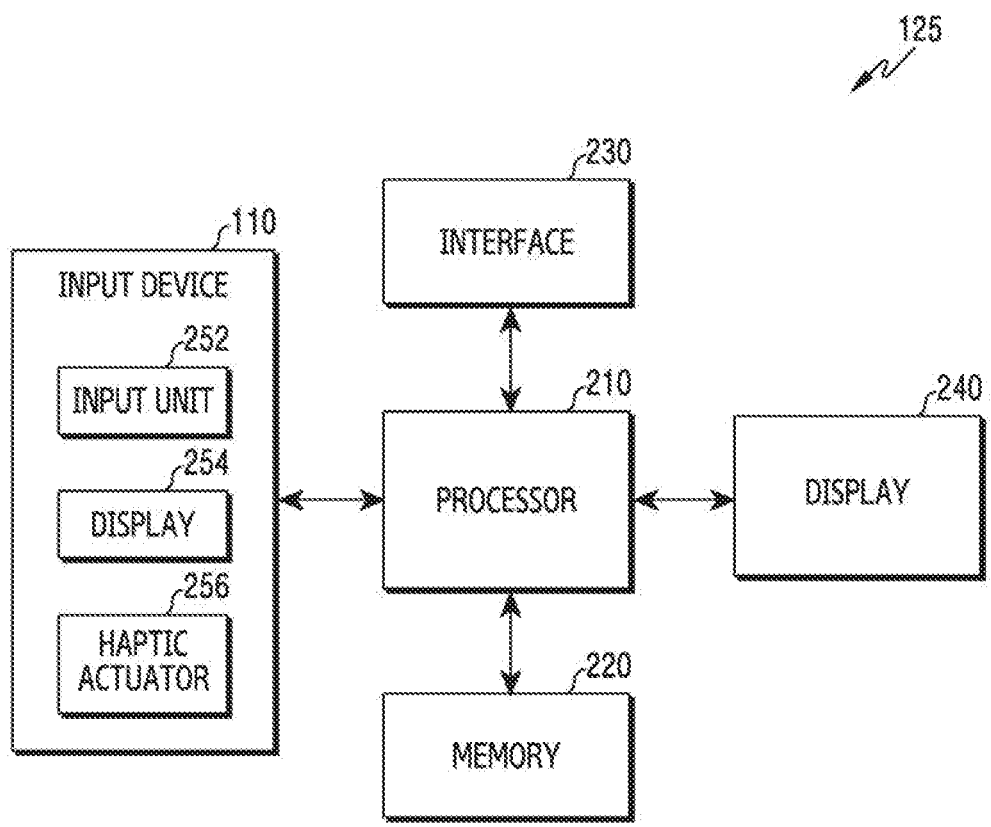
FIG. 2A is a diagram illustrating an example of the functional configuration of an electronic device according to various embodiments of the disclosure.

FIG. 2A is a diagram illustrating an example of the functional configuration of an electronic device according to various embodiments of the disclosure. The functional configuration of the electronic device may be included in the electronic device 125 of FIG. 1.

Referring to FIG. 2A, the electronic device 125 may include a processor 210, a memory 220, an interface 230, a display 240, and the input device 110.

The processor 210 may control the overall operation of the electronic device 125. The processor 210 may execute applications that provide advertisements, the Internet, games, videos, and the like. According to various embodiments, the processor 210 may include a single processor core (single core) or may include multiple processor cores. For example, the processor 210 may include a multi-core such as a dual-core, a quad-core, a hexa-core, and the like. According to some embodiments, the processor 210 may further include a cache memory that is located inside or outside the processor 210.

The processor 210 may receive commands from other components of the electronic device 125, may interpret the received commands, and may execute calculation or process data based on the interpreted commands.

The processor 210 may process data or signals generated by an application. For example, the processor 210 may request instructions, data, or signals from the memory 220 so as to execute or control an application. The processor 210 may record (or store) or update instructions, data, or signals in the memory 220 so as to execute or control an application.

The processor 210 may interpret or process messages, data, instructions, or signals received from the memory 220, the interface 230, the display 240, or the input device 110. Also, the processor 210 may generate new messages, data, instructions, or signals based on received messages, data, instructions, or signals. The processor 210 may provide the generated or processed messages, data, instructions, or signals to the memory 220, the interface 230, the display 240, the input device 110, and the like.

A part or the whole of the processor 210 may be electrically or operably coupled with or connected to other components of the electronic device 125 (e.g., the memory 220, the interface 230, the display 240, or the input device 110).

According to embodiments, the processor 210 may be configured with one or more processors. For example, the processor 210 may include an application processor (AP) that controls an upper layer program such as an application program and the like, or may include a communication processor (CP) that executes control for communication.

The memory 220 may store instructions for controlling the electronic device 125, control instruction codes, control data, or user data. For example, the memory 220 may include applications, an operating system (OS), middleware, and a device driver.

The memory 220 may include one or more from among volatile memory and a non-volatile memory. The volatile memory may include a dynamic random access memory (DRAM), a static RAM (SRAM), a synchronous DRAM (SDRAM), a phrase-change RAM (PRAM), a magnetic RAM (MRAM), a resistive RAM (RRAM), ferroelectric RAM (FeRAM), and the like. The non-volatile memory may include read only memory (ROM), programmable ROM (PROM), electrically programmable ROM (EPROM), electrically erasable ROM (EEPROM), and a flash memory.

The memory 220 may include a non-volatile medium, such as a hard disk drive (HDD), a solid state disk (SSD), an embedded multimedia card (eMMC), and a universal flash storage (UFS).

The interface 230 may be used to generate a communication path between the electronic device 125 and another electronic device (e.g., an external electronic device or a device embedded in a vehicle). The interface 230 may support a designated protocol for connecting another electronic device in a wired or wireless manner. For example, the interface 230 may include a module for at least one from among a Bluetooth communication scheme, a Bluetooth low energy (BLE) communication scheme, a Wi-Fi communication scheme, a cellular (or mobile) communication scheme, and a wired communication scheme. As another example, the interface 230 may include a high definition multimedia interface (HDMI), a universal serial bus (USB) interface, an SD card interface, or an audio interface, which operate in association with a connection terminal such as an HDMI connector, a USB connector, an SD card connector, or an audio connector (e.g., a headphone connector).

The interface 230 may provide, to the processor 210, information or data received from the other electronic device via the communication path. The interface 230 may transmit information or data provided from the processor 210 to the other electronic device via the communication path.

The display 240 may output contents, data, or signals. According to various embodiments, the display 240 may display an image signal processed by the processor 210. For example, the display 240 may display a captured image or a still image. As another example, the display 240 may display a video or camera preview image. As another example, the display 240 may display a graphical user interface (GUI) so that a user interacts with the electronic device 125.

The display 240 may be configured with a liquid crystal display (LCD) or an organic light emitting diode (OLED).

According to various embodiments, the display 240 may be configured with an integrated touch screen, by coupling to a sensor that is capable of receiving a touch input or the like.

The input device 110 may receive an instruction, an interaction, or data from a user. The input device 110 may sense a touch input or a hovering input provided by a finger and a pen. The input device 110 may sense an input caused by a rotatable structure or a physical button (e.g., the housing of the input device 110). The input device 110 may include sensors for sensing various types of inputs. Various types of inputs may be received by the input device 110. For example, an input received by the input device 110 may include a touch and release, a drag and drop, a long touch, a force touch, a physical press (depression), and the like. The input device 110 may provide a received input and data related to the received input to the processor 210. Although not illustrated in FIG. 2A, according to various embodiments, the input device 110 may include a microphone (or a transducer) that is capable of receiving a voice command from a user. Although not illustrated in FIG. 2A, according to various embodiments, the input device 110 may include an image sensor or a camera which is capable of receiving a user motion.

The input device 110 may include an input unit 252, a display 254, and a haptic actuator 256.

The input unit 252 may include one or more from among a physical button, a rotatable structure, and a touch sensor capable of detecting a touch input.

According to various embodiments, the physical button may be configured as the housing of the input device 110. The housing may be configured to detect a depression on at least a part of the first surface that faces a user. For example, the housing may linearly move in a direction vertical to the first surface, based on a click input caused by a user.

According to various embodiments, the rotatable structure may be mounted on at least a part of the first surface. The rotatable structure may be configured to enclose the display 254 when the first surface is viewed from a top. The rotatable structure may be configured in a ring shape or may be configured in a ring shape including a plurality of grooves for providing a user with the feel of grip. The rotatable structure may be configured to detect a rotational input to the input device 110.

According to various embodiments, the touch sensor may detect a touch input on the input device 110. For example, the touch sensor may detect a touch and release, a drag and drop, a long touch, a force touch, and the like which may be received on the display 254. To this end, the touch sensor may be configured with an integrated touch screen, by coupling to the display 254.

The display 254 may output contents, data, or signals. According to various embodiments, the display 254 may display an image signal processed by the processor 210. For example, the display 254 may display a captured image or a still image. As another example, the display 254 may display a video or camera preview image. As another example, the display 254 may display a GUI so that a user interacts with the electronic device 125. According to various embodiments, the display 254 may not be included in the input device 110. In other words, the display 254 may not be an essential component of the input device 110.

The display 254 may be configured with a LCD or an OLED.

According to various embodiments, the display 254 may be configured with an integrated touch screen, by coupling to the touch sensor.

The haptic actuator 256 may provide a haptic effect to the housing or the rotatable structure so that a user causes an intended input based on the sense of touch.

According to various embodiments, the processor 210 may map the at least one function to the input device 110 so that the input device 110 has at least one of a plurality of functions of the vehicle. For example, the at least one function may include at least one from among a function related to an emergency call, a function related to an incoming call, a function related to message reception, a function related to an alarm or a notification, a function related to navigation, a function related to providing weather information, a function related to volume control, a function related to a clock, a function related to wind direction control, a function related to temperature, a function related to wind speed, a function related to removal of humidity, a function related to a driving mode of a vehicle, a function related to opening and shutting of the gas cap of a vehicle, a function related to opening and shutting of a window of a vehicle, and a function related to a voice recognition service. Various methods of mapping the at least one function to the input device 110 will be described later.

According to various embodiments, the processor 210 may transmit configuration information to the input device 110, so as to indicate the at least one function that is mapped to the input device 110. The configuration information may include data for displaying, on the display 254 of the input device 110, an indication for indicating a function to be provided via the input device 110 from among the plurality of functions. The configuration information may include data for indicating a function selected by the processor 210 from among the plurality of functions. According to embodiments, the configuration information may further include data associated with a plurality of input values which are allocated based on a degree of rotation of the rotatable structure which is included in the input unit 252 of the input device 110 and is rotated by a rotational input.

According to various embodiments, the input device 110 may receive the configuration information from the processor 210. The input device 110 may display an indication for indicating the function based on the configuration information.

Figure 3:
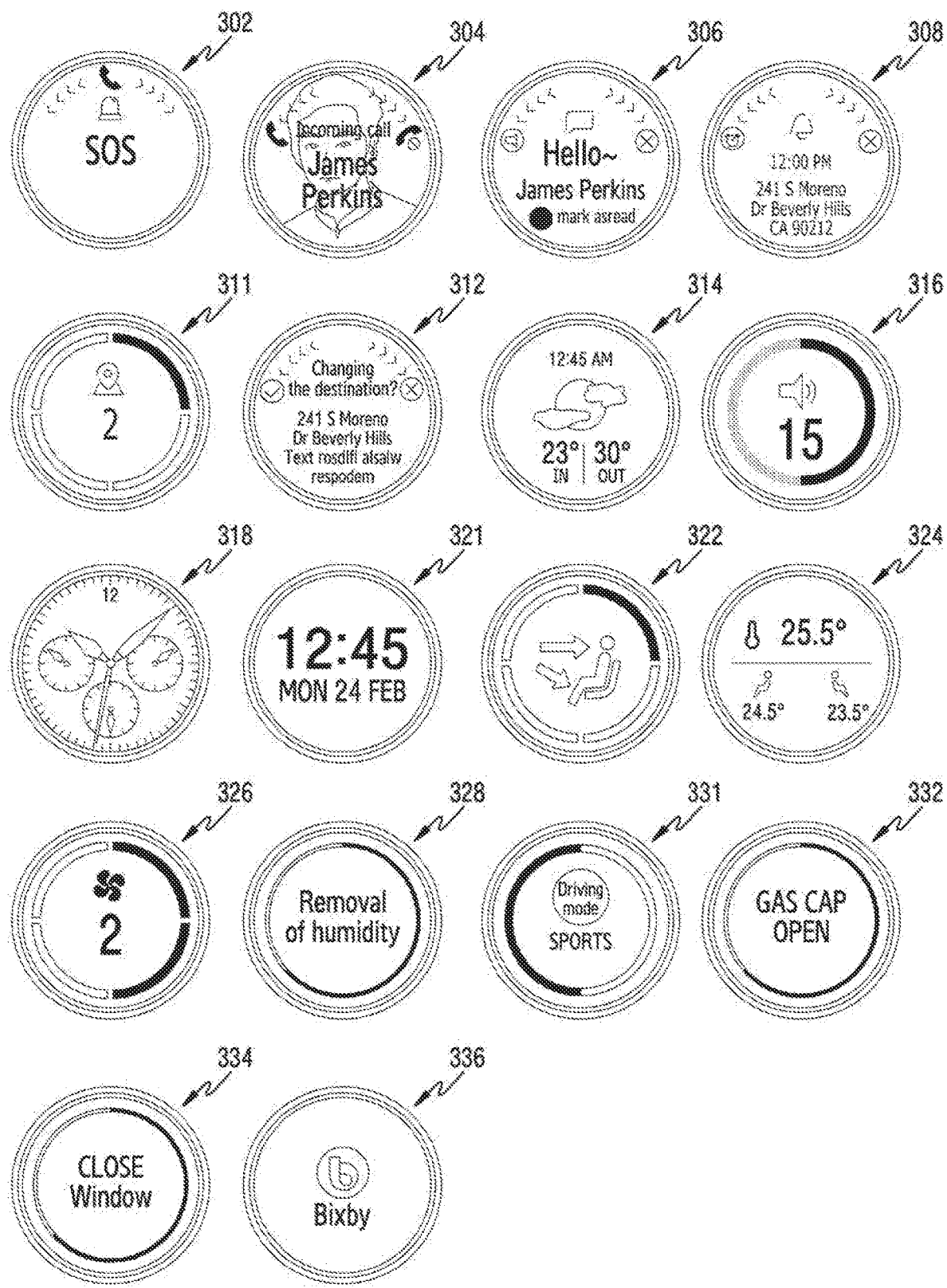
FIG. 3 is a diagram illustrating examples of indications displayed in an input device according to various embodiments of the disclosure.

FIG. 3 is a diagram illustrating examples of indications displayed in an input device according to various embodiments of the disclosure.

Referring to FIG. 3, the input device 110 may display an indication 302 based on the configuration information received from the processor 210. The indication 302 may indicate that the input device 110 is capable of sending an emergency call. For example, the indication 302 may include at least one visual object (e.g., text (SOS), a figure in the form of a siren, or a figure in the form of a telephone in the indication 302) so as to represent an emergency call. As another example, the indication 302 may include at least one visual object (e.g., an arrow in the indication 302) for indicating a rotation direction of the rotatable structure which is required to send an emergency call. An emergency call may be sent directly by the electronic device 125, or may be indirectly sent by interoperation between the electronic device 125 and an external electronic device (e.g., a smart phone).

Referring to FIG. 3, the input device 110 may display an indication 304 based on the configuration information received from the processor 210. The indication 304 may indicate that the input device 110 is capable of receiving an incoming call. For example, the indication 304 may include at least one visual object (e.g., text (incoming call), a figure representing accept of an incoming call, or a figure representing rejection of an incoming call in the indication 304) so as to represent an incoming call. As another example, the indication 304 may include at least one visual object (e.g., a figure representing accept of an incoming call or a figure representing rejection of an incoming call) so as to represent a method of processing an incoming call. As another example, the indication 304 may include at least one visual object (e.g., text (James Perkins) in the indication 304) so as to represent a caller of an incoming call. As another example, the indication 304 may include at least one visual object (e.g., an arrow in the indication 304) for indicating a rotation direction of the rotatable structure which is required to accept reception of an incoming call. An incoming call may be received directly by the electronic device 125, or may be received by interoperation between the electronic device 125 and an external electronic device (e.g., a smart phone).

As another example, referring to FIG. 3, the input device 110 may display an indication 306 based on the configuration information received from the processor 210. The indication 306 may indicate that the input device 110 is capable of processing a received message. For example, the indication 306 may include at least one visual object (e.g., a figure in the form of a message of the indication 306) so as to represent a received message. As another example, the indication 306 may include at least one visual object (a figure representing a voice reply to a received message, a figure representing postponement of processing a received message, or text indicating that a received message will be processed to have a state of "read") so as to represent a method of processing a received message. As another example, the indication 306 may include at least one visual object (e.g., text (James Perkins) of the indication 306) so as to represent the sender of a received message. As another example, the indication 306 may include at least one visual object (e.g., an arrow of the indication 306 and a depression representation (e.g., a dot) of the indication 306) so as to represent an input method which is required to process a received message. A received message may be processed directly by the electronic device 125, or may be indirectly processed by interoperation between the electronic device 125 and an external electronic device (e.g., a smart phone).

As another example, referring to FIG. 3, the input device 110 may display an indication 308 based on the configuration information received from the processor 210. The indication 308 may indicate that the input device 110 is capable of processing an alarm or a notification. For example, the indication 308 may include at least one visual object (e.g., a figure in the form of a bell of the indication 308) so as to represent output or provision of an alarm or a notification. As another example, the indication 308 may include at least one visual object (e.g., text (12:00 PM, 241 S Moreno Dr Beverly Hills Calif. 90212) of the indication 308), so as to indicate a time and/or a place related to an alarm or a notification. As another example, the indication 308 may include at least one visual object (e.g., a figure in the form of a table clock or a figure in the form of X) so as to represent a method of processing an alarm or a notification. As another example, the indication 308 may include at least one visual object (e.g., an arrow of the indication 308) so as to represent an input method which is required to process an alarm or a notification. An alarm or a notification may be processed directly by the electronic device 125, or may be indirectly processed by interoperation between the electronic device 125 and an external electronic device.

As another example, referring to FIG. 3, the input device 110 may display an indication 311 based on the configuration information received from the processor 210. The indication 311 may indicate that the input device 110 is capable of controlling the screen magnification of a map of a navigation service. For example, the indication 311 may include at least one visual object (e.g., a figure in the form representing the current location in the indication 311 or text (2) indicating a screen magnification in the indication 311), so as to represent control of a screen magnification. As another example, the indication 311 may include at least one visual object (e.g., a status bar displayed in an area corresponding to a boundary of the indication 311) so as to represent an input method for controlling a screen magnification. The screen magnification of a map of a navigation service may be controlled directly by the electronic device 125, or may be indirectly processed by interoperation between the electronic device 125 and an external electronic device.

As another example, referring to FIG. 3, the input device 110 may display an indication 312 based on the configuration information received from the processor 210. The indication 312 may indicate that the input device 110 is capable of changing a destination currently set in a navigation service. For example, the indication 312 may include at least one visual object (e.g., text (changing the destination) of the indication 312) so as to ask whether to change a destination. As another example, the indication 312 may include at least one visual object (e.g., text (241 S Moreno Dr Beverly Hills Text rosdlfl alsalw respodem) of the indication 312) so as to represent information associated with a candidate destination. As another example, the indication 312 may include at least one visual object (e.g., an arrow of the indication 312) so as to represent an input method which is required to change a destination. A destination may be changed directly by the electronic device 125, or may be indirectly changed by interoperation between the electronic device 125 and an external electronic device.

As another example, referring to FIG. 3, the input device 110 may display an indication 314 based on the configuration information received from the processor 210. The indication 314 may represent that weather information is provided via the input device 110. For example, the indication 314 may include at least one visual object (e.g., a feature in a sun shape, a figure in a cloud shape, text (12:45 AM) representing the current time, text (23 degrees) representing the temperature inside a vehicle, text (30 degrees) representing the temperature outside a vehicle) so as to represent that weather information is currently provided via the input device 110. The weather information may be provided directly by the electronic device 125, or may be indirectly provided by interoperation between the electronic device 125 and an external electronic device.

As another example, referring to FIG. 3, the input device 110 may display an indication 316 based on the configuration information received from the processor 210. The indication 316 may indicate that the input device 110 is capable of controlling the volume of a speaker inside a vehicle. For example, the indication 316 may include at least one visual object (e.g., a figure in the form of a speaker, and text (15) representing the current volume of a speaker) so as to represent that increasing or decreasing the volume of a speaker of a vehicle is allowed. As another example, the indication 316 may include at least one visual object (e.g., a status bar displayed in an area corresponding to a boundary of the indication 316) so as to represent a degree of increase in a volume which is allowed from the current volume of the speaker, or a degree of degrease in a volume which is allowed from the current volume of the speaker. The volume may be controlled directly by the electronic device 125, or may be indirectly controlled by interoperation between the electronic device 125 and an external electronic device.

As another example, referring to FIG. 3, the input device 110 may display an indication 318 based on the configuration information received from the processor 210. The indication 318 may represent that the current time is provided via the input device 110. For example, the indication 318 may include at least one visual object (e.g., a figure in the form of an analog watch of the indication 318) so as to represent the current time. The current time may be provided directly by the electronic device 125, or may be indirectly provided by interoperation between the electronic device 125 and an external electronic device.

As another example, referring to FIG. 3, the input device 110 may display an indication 321 based on the configuration information received from the processor 210. The indication 321 may represent that the current time is provided via the input device 110. For example, the indication 321 may include at least one visual object (e.g., a figure in the form of a digital watch of the indication 321) so as to represent the current time. The current time may be provided directly by the electronic device 125, or may be indirectly provided by interoperation between the electronic device 125 and an external electronic device.

As another example, referring to FIG. 3, the input device 110 may display an indication 322 based on the configuration information received from the processor 210. The indication 322 may indicate that the input device 110 is capable of controlling the wind direction of an air conditioner inside a vehicle. For example, the indication 322 may include at least one visual object (e.g., a figure representing the wind direction and a user who sits in a seat in the indication 322) so as to represent control of a wind direction. As another example, the indication 322 may include at least one visual object (e.g., a status bar located in an area corresponding to a boundary of the indication 322) so as to represent an input method required to control a wind direction and the number of options which are controllable to control a wind direction. The wind direction may be controlled directly by the electronic device 125, or may be indirectly controlled by interoperation between the electronic device 125 and an external electronic device (e.g., air conditioner in the vehicle).

As another example, referring to FIG. 3, the input device 110 may display an indication 324 based on the configuration information received from the processor 210. The indication 324 may represent that temperature information related to a vehicle is provided via the input device 110. For example, the indication 324 may include at least one visual object (e.g., a figure in the form of a thermometer or text indicating temperature in the indication 324) so as to represent the temperature inside a vehicle.

As another example, referring to FIG. 3, the input device 110 may display an indication 326 based on the configuration information received from the processor 210. The indication 326 may indicate that the input device 110 is capable of controlling an air volume or a wind speed. For example, the indication 326 may include at least one visual object (e.g., a figure in the form of a fan in the indication 326) so as to represent a wind speed or an air volume. As another example, the indication 326 may include at least one visual object (e.g., a status bar located in an area corresponding to a boundary of the indication 326) so as to represent the current wind speed and an input method required to control a wind speed or an air volume. The wind speed or air volume may be controlled directly by the electronic device 125, or may be indirectly controlled by interoperation between the electronic device 125 and an external electronic device (e.g., an air conditioner in a vehicle).

As another example, referring to FIG. 3, the input device 110 may display an indication 328 based on the configuration information received from the processor 210. The indication 328 may indicate that the input device 110 is capable of removing humidity inside a vehicle. For example, the indication 328 may include at least one visual object (e.g., text (removal of humidity) of the indication 328) so as to represent removal of humidity. The removal of humidity may be processed directly by the electronic device 125, or may be indirectly processed by interoperation between the electronic device 125 and an external electronic device (e.g., an air conditioner or humidity control device in a vehicle).

As another example, referring to FIG. 3, the input device 110 may display an indication 331 based on the configuration information received from the processor 210. The indication 331 may indicate that the input device 110 is capable of changing a driving mode of a vehicle. For example, the indication 331 may include at least one visual object (e.g., a figure in the circular shape including text (driving mode) in the indication 331) so as to represent a driving mode. As another example, the indication 331 may include at least one visual object (e.g., text (sports) of the indication 331) so as to represent a driving mode that is currently provided. As another example, the indication 331 may include at least one visual object (e.g., a status bar in an area corresponding to a boundary of the indication 331) so as to represent an input method required to change a driving mode and the number of driving modes providable in a vehicle. Changing a driving mode may be processed directly by the electronic device 125, or may be indirectly processed by interoperation between the electronic device 125 and an external electronic device (a running device included in a vehicle).

As another example, referring to FIG. 3, the input device 110 may display an indication 332 based on the configuration information received from the processor 210. The indication 332 may indicate that the input device 110 is capable of controlling a gas cap of a vehicle. For example, the indication 332 may include at least one visual object (e.g., text (gas cap open) of the indication 332) so as to represent control of the gas cap of a vehicle. As another example, the indication 332 may include at least one visual object (e.g., a status bar in an area corresponding to a boundary of the indication 332) so as to represent an input method required to open the gas cap of a vehicle. Controlling the gas cap may be processed directly by the electronic device 125, or may be indirectly processed by interoperation between the electronic device 125 and an external electronic device.

As another example, referring to FIG. 3, the input device 110 may display an indication 334 based on the configuration information received from the processor 210. The indication 334 may indicate that the input device 110 is capable of controlling a window of a vehicle. For example, the indication 334 may include at least one visual object (e.g., text (close window) of the indication 334) so as to represent a window of a vehicle. As another example, the indication 334 may include at least one visual object (e.g., a status bar in an area corresponding to a boundary of the indication 334) required to control a window of a vehicle. Controlling the window may be processed directly by the electronic device 125, or may be indirectly processed by interoperation between the electronic device 125 and an external electronic device.

As another example, referring to FIG. 3, the input device 110 may display an indication 336 based on the configuration information received from the processor 210. The indication 336 may indicate that the input device 110 is capable of providing a voice recognition service. For example, the indication 336 may include at least one visual object (e.g., text (bixby) and a figure representing a voice recognition service in the indication 336) so as to represent that a voice recognition service is providable. Providing the voice recognition service may be processed directly by the electronic device 125, or may be indirectly processed by interoperation between the electronic device 125 and an external electronic device (e.g., at least one server for a voice recognition service).

According to various embodiments, the processor 210 may provide at least one service related to a function mapped to the input device 110, using the input device 110. The processor 210 may provide at least one service related to a function mapped to the input device 110, based on an intuitive user input detected via the input device 110. According to various embodiments, the input device 110 may detect a user input to the input device 110 (e.g., a click input or a touch input on the housing of the input device 110, or a rotational input on the rotatable structure of the input device 110). The input device 110 may provide information associated with the detected user input to the processor 210. Based at least on information associated with the user input obtained from the input device 110, the processor 210 may provide the at least one service via the electronic device 125 or another electronic device (e.g., various devices embedded in a vehicle, or various devices related to the vehicle (e.g., another electronic device having a user account related to a user account of the electronic device 125)) that is directly or indirectly connected to the electronic device 125.

FIGS. 4A to 4L are diagrams illustrating examples of changes in indications displayed in an input device according to various embodiments of the disclosure.

Figure 4A:
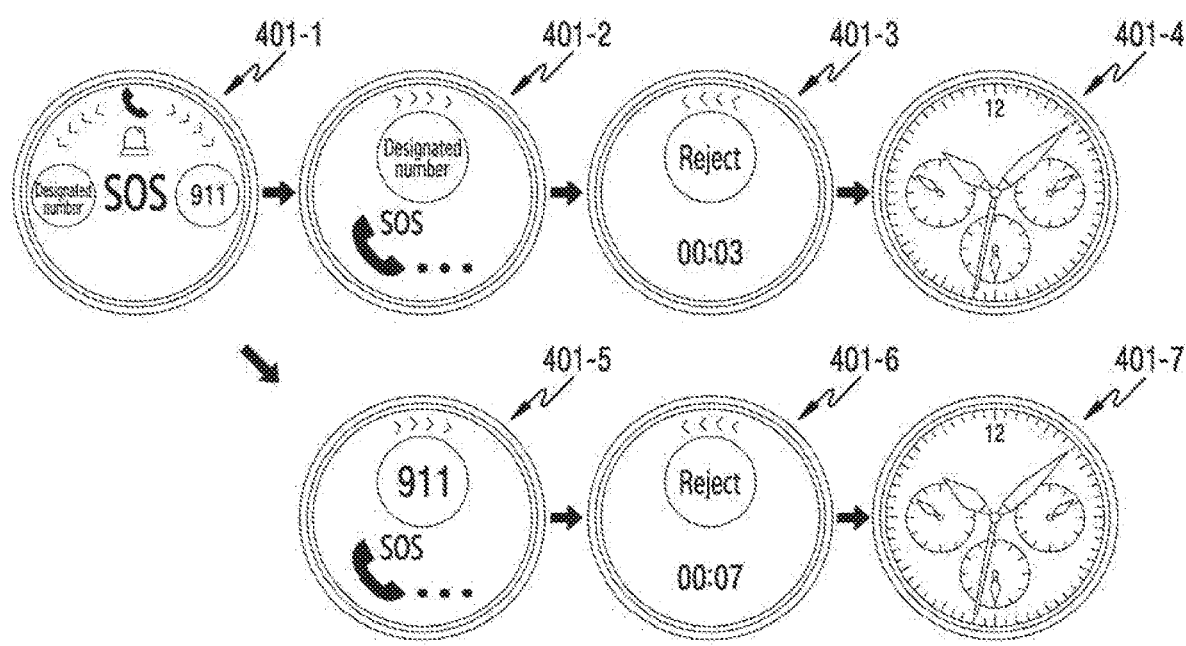
FIGS. 4A to 4L are diagrams illustrating examples of changes in indications displayed in an input device according to various embodiments of the disclosure.

Referring to FIG. 4A, the processor 210 may display, on the display 254 of the input device 110, an indication 401-1 for indicating that a function currently mapped to the input device 110 is sending an emergency call. The processor 210 may detect a user input to the input device 110 via the input device 110, in the state in which the indication 401-1 is displayed on the display 254. The user input may be a rotational input that rotates the rotatable structure in a first direction (e.g., clockwise). The user input may be an input that rotates the rotatable structure in a second direction (e.g., counterclockwise) which is different from the first direction. The user input may be detected via various methods. For example, the detection of a user input may be completed on condition that the rotatable structure is rotated by the rotational input and stops during a predetermined period of time. As another example, the detection of a user input may be completed on condition that the rotatable structure is rotated by the rotational input and then, a click input or a touch input on the housing is detected.

The processor 210 may send an emergency call to another electronic device corresponding to a designated number, in response to detecting, via the input device 110, the user input including the rotational input in the second direction. The emergency call may be sent directly via the interface 230 of the electronic device 125, or may be sent via an external electronic device (e.g., a smart phone) connected via the interface 230 of the electronic device 125. The designated number may be a phone number of an insurance company related to a user of a vehicle or a phone number of a family of the user of the vehicle. The designated number may be changed by user's setting. The processor 210 may display, on the display 254, information 401-2 indicating that the emergency call is sent to the other electronic device corresponding to the designated number in response to detecting, by the input device 110, the user input including the rotational input in the second direction. The information 401-2 may be changed or converted from the indication 401-1. The user may recognize that the emergency call is currently sent to the designated number, based on the information 401-2.

When the emergency call is connected (or when the emergency call is successfully sent), the processor 210 may provide a call service with the other electronic device. When the emergency call is connected, the processor 210 may display information 401-3 indicating that a call service with the other electronic device is provided. The information 401-3 may be changed or converted from the information 401-2. The information 401-3 may include at least one visual object (e.g., a figure in a circular shape including text (reject) and an arrow indicating the counterclockwise direction in the information 401-3) representing text indicating a call duration and an input method required to terminate a call.

The processor 210 may display information 401-4 changed from the information 401-3, when it is identified that the emergency call with the other electronic device is terminated in the state in which the information 401-3 is displayed on the display 254. The termination of the emergency call with the other electronic device may be identified by an operation of detecting a user input including a rotational input in the first direction, which is received via the input device 110. The termination of the emergency call with the other electronic device may be identified by an operation of detecting the termination of a communication connection with the other electronic device. The information 401-4 may be used for providing the current time.

The processor 210 may send an emergency call to another electronic device corresponding to "911", in response to detecting, via the input device 110, a user input including a rotational input in the first direction. The processor 210 may display, on the display 254, information 401-5 indicating that the emergency call is sent to the other electronic device corresponding to "911" in response to detecting, by the input device, the user input including the rotational input in the first direction. The information 401-5 may be changed or converted from the indication 401-1.

When the emergency call is connected, the processor 210 may provide a call service with the other electronic device. When the emergency call is connected, the processor 210 may display information 401-6 indicating that a call service with the other electronic device is provided. The information 401-6 may be changed or converted from the information 401-5. The information 401-6 may include at least one visual object (e.g., a figure in a circular shape including text (reject) and an arrow indicating the counterclockwise direction in the information 401-6) representing text indicating a call duration and an input method required to terminate a call.

The processor 210 may display information 401-7 changed from the information 401-6, when it is identified that the emergency call with the other electronic device is terminated in the state in which the information 401-6 is displayed on the display 254. The information 401-6 may be used for providing the current time.

Figure 4B:
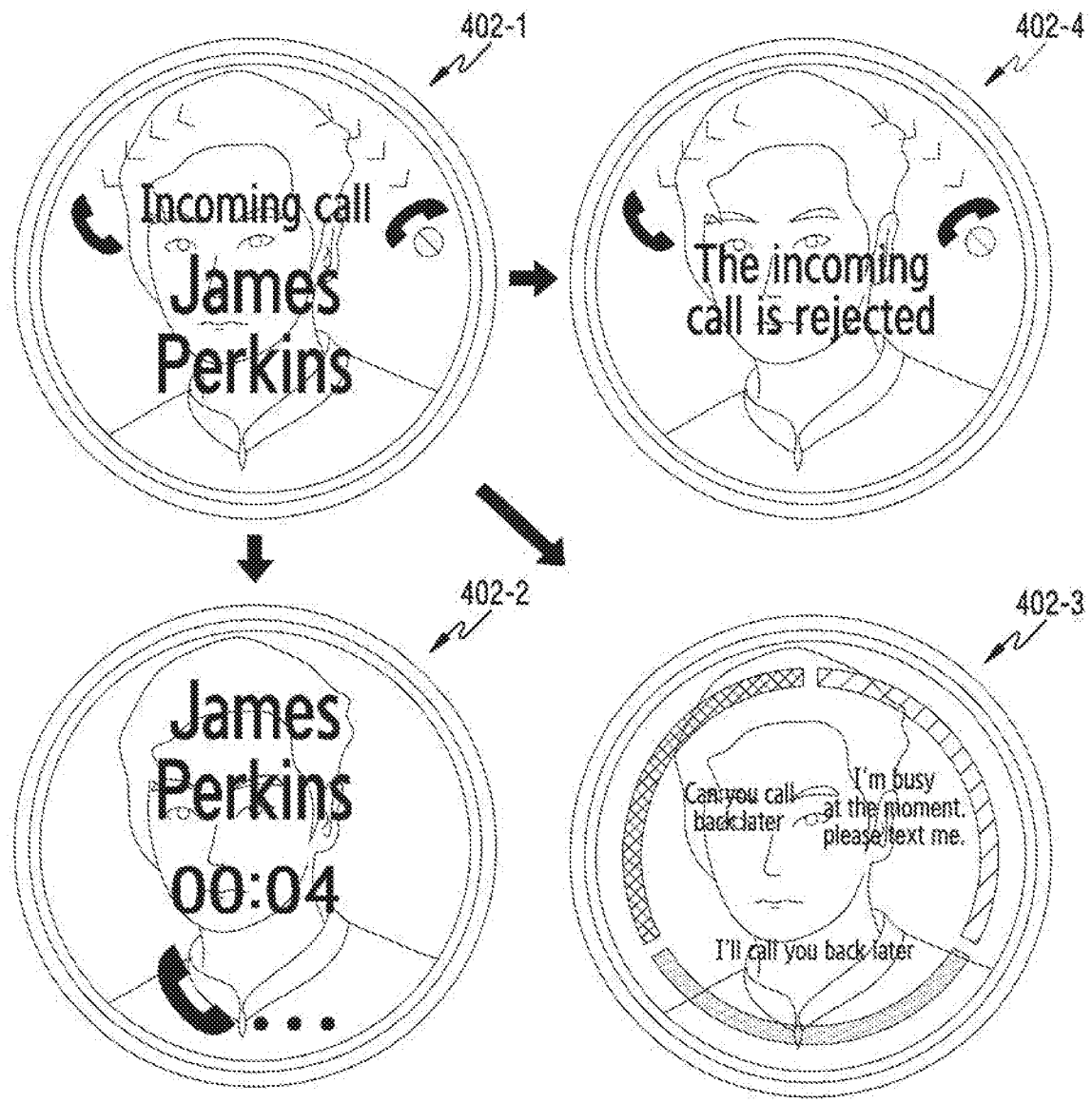

Referring to FIG. 4B, the processor 210 may display, on the display 254 of the input device 110, an indication 402-1 for indicating that a function currently mapped to the input device 110 is reception of an incoming call. The processor 210 may detect a user input to the input device 110 via the input device 110, in the state in which the indication 402-1 is displayed on the display 254.

When a user input including a rotational input for rotating the rotatable structure in the second direction is detected via the input device 110, the processor 210 may accept connecting the incoming call which is received from an external electronic device (e.g., an electronic device related to James Perkins) via another electronic device (e.g., a smart phone of the user related to the vehicle), or is directly received from the external electronic device. In other words, the processor 210 may generate or establish a communication connection with the other electronic device for the incoming call, based on the detection of the user input. The processor 210 may display information 402-2 changed from the indication 402-1, so as to represent that connection with the other electronic device is established for the incoming call. The information 402-2 may include at least one visual object (e.g., text (James Perkins, 00:04) of the information 402-2) for indicating a sender and a call duration of the incoming call.

When a user input including a rotational input for rotating the rotatable structure in the first direction is detected via the input device 110, the processor 210 may reject connecting the incoming call which is received from the external electronic device via the other electronic device or is directly received from the external electronic device. The processor 210 may display information 402-4 which is changed from the indication 402-1, so as to represent rejection. The information 402-4 may include at least one visual object (e.g., text (the incoming call is rejected) of the information 402-4) for indicating that the incoming call is rejected.

When a user input including a click input or a touch input on the housing is detected via the input device 110, the processor 210 may display information 402-3 for rejecting the connection of the incoming call which is received from the external electronic device via the other electronic device or is directly received from the external electronic device, and for transmitting a message to the external electronic device. The information 402-3 may be changed from the indication 402-1. The information 402-3 may include at least one visual object for representing that rejection of the incoming call together with transmission of a message is allowed. The information 402-3 may include at least one visual object (e.g., text in the information 402-3 and a status bar in an area corresponding to a boundary of the information 402-3) for determining the content of the message and for representing an input required to determine the content of the message. The processor 210 may transmit a message including the content "I'm busy at the moment please text me." to the other electronic device in response to detection of a rotational input that rotates the rotatable structure in the first direction at a first angle or a rotational input that rotates the rotatable structure in the second direction at a second angle, in the state in which the information 402-3 is displayed on the display 254. The processor 210 may transmit a message including the content "I'll call you back later." to the other electronic device in response to detection of a rotational input that rotates the rotatable structure in the first direction at a third angle or a rotational input that rotates the rotatable structure in the second direction at a fourth angle, in the state in which the information 402-3 is displayed on the display 254. The processor 210 may transmit a message including the content "can you call back later." to the other electronic device in response to detection of a rotational input that rotates the rotatable structure in the first direction at a fifth angle or a rotational input that rotates the rotatable structure in the second direction at a sixth angle, in the state in which the information 402-3 is displayed on the display 254. The message may be transmitted directly by the electronic device 125, or may be indirectly transmitted by interoperation between the electronic device 125 and an external electronic device (e.g., a smart phone of the user of the electronic device 125).

Figure 4C:
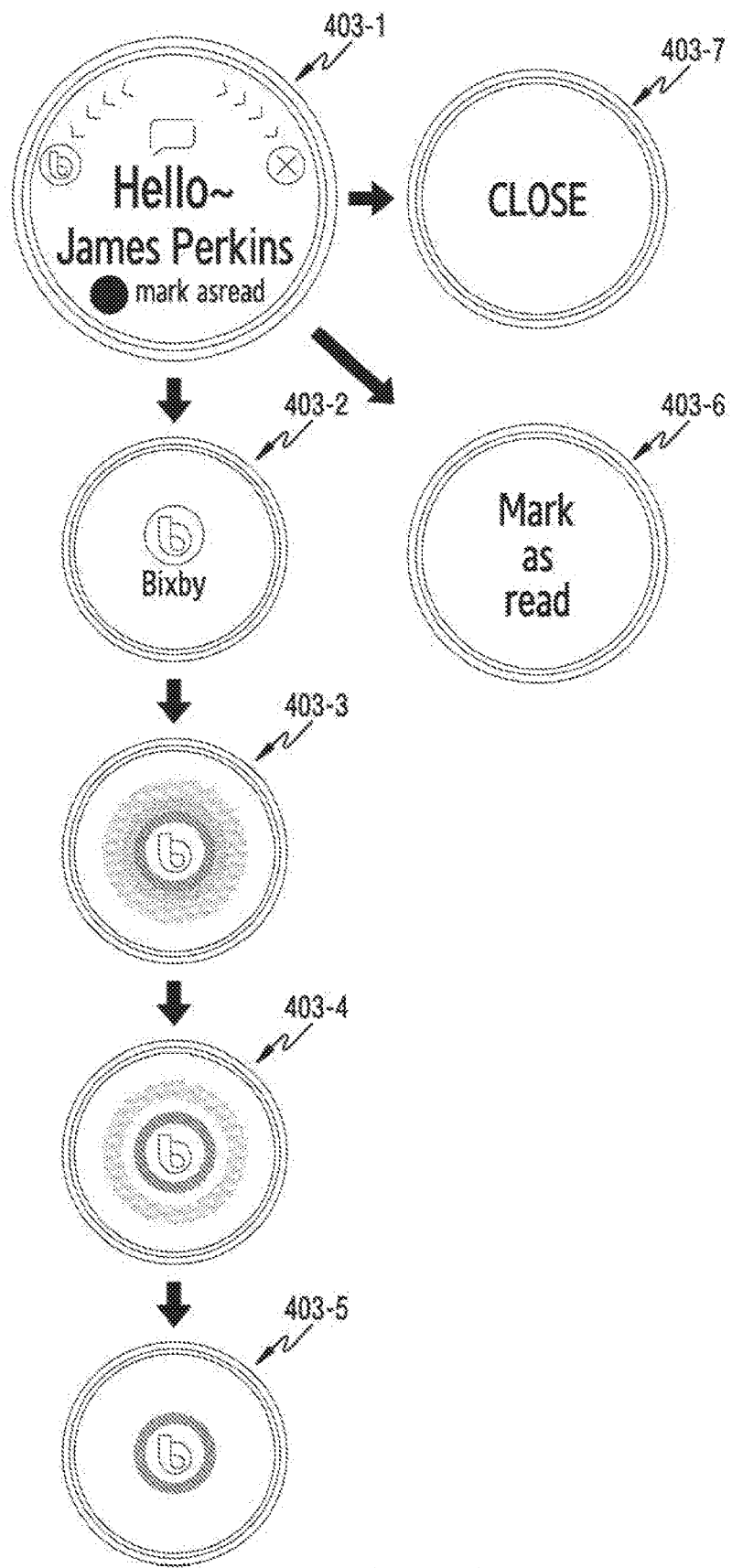

Referring to FIG. 4C, the processor 210 may display, on the display 254 of the input device 110, an indication 403-1 for indicating that a function currently mapped to the input device 110 is reception of a message. The indication 403-1 may display the content (hello) of the received message. The indication 403-1 may display information (James Perkins) for indicating a user who transmits the received message. The indication 403-1 may display information associated with methods of processing the received message and information indicating input methods required to process the received message. The processor 210 may detect a user input to the input device 110 via the input device 110, in the state in which the indication 403-1 is displayed on the display 254.

The processor 210 may display information 403-2 changed from the indication 403-1 when a user input including a rotational input for rotating the rotatable structure in the second direction is detected by the input device 110. The information 403-2 may display at least one visual object for representing that a replay to the received message is allowed via a voice recognition service. The processor 210 may receive information associated with a voice signal in the state in which the information 403-2 is displayed on the display 254. The information associated with the voice signal may be directly received via a microphone (not illustrated) or a transducer (not illustrated) included in the electronic device 125, or may be indirectly received via a microphone in the vehicle that interoperates with the electronic device 125. The sound signal may include a wake-up command (e.g., Hey Bixby and the like) and a voice command subsequent to the wake-up command. According to embodiments, the wake-up command may be omitted in some embodiments.

The processor 210 may display information 403-3 which is changed from the information 403-2, so as to represent that the voice signal is currently received. When the reception of the voice signal is completed, the processor 210 may display information 403-4 changed from the information 403-3 on the display 254, so as to represent that the reception of the voice signal is completed. The processor 210 may display the information 403-4, and may provide a voice feedback indicating that a message (i.e., a replay message) including a content corresponding to the voice command included in the voice signal is sent to the user "James Perkins", via a speaker of the vehicle. The processor 210 may display information 403-5 which is changed from the information 403-4 on the display 254, so as to represent that the voice feedback is provided.

The processor 210 may display information 403-7 changed from the indication 403-1 when a user input including a rotational input for rotating the rotatable structure in the first direction is detected by the input device 110. The information 403-7 may indicate that processing the received message is postponed, or that the received message is stored in the electronic device 125 or an external electronic device (e.g., a smart phone) interoperating with the electronic device 125, without processing the received message to have a state of "read".

The processor 210 may display information 403-6 changed from the indication 403-1 when a user input including a touch input or a click input that depresses the housing is detected by the input device 110. The information 403-6 may indicate that the received message is processed to have a state of "read". The received message which is processed based on the user input including the touch input or the click input may be stored as a state of "read" in the electronic device 125, or may be stored as a state of "read" in an external electronic device interoperating with the electronic device 125.

Figure 4D:
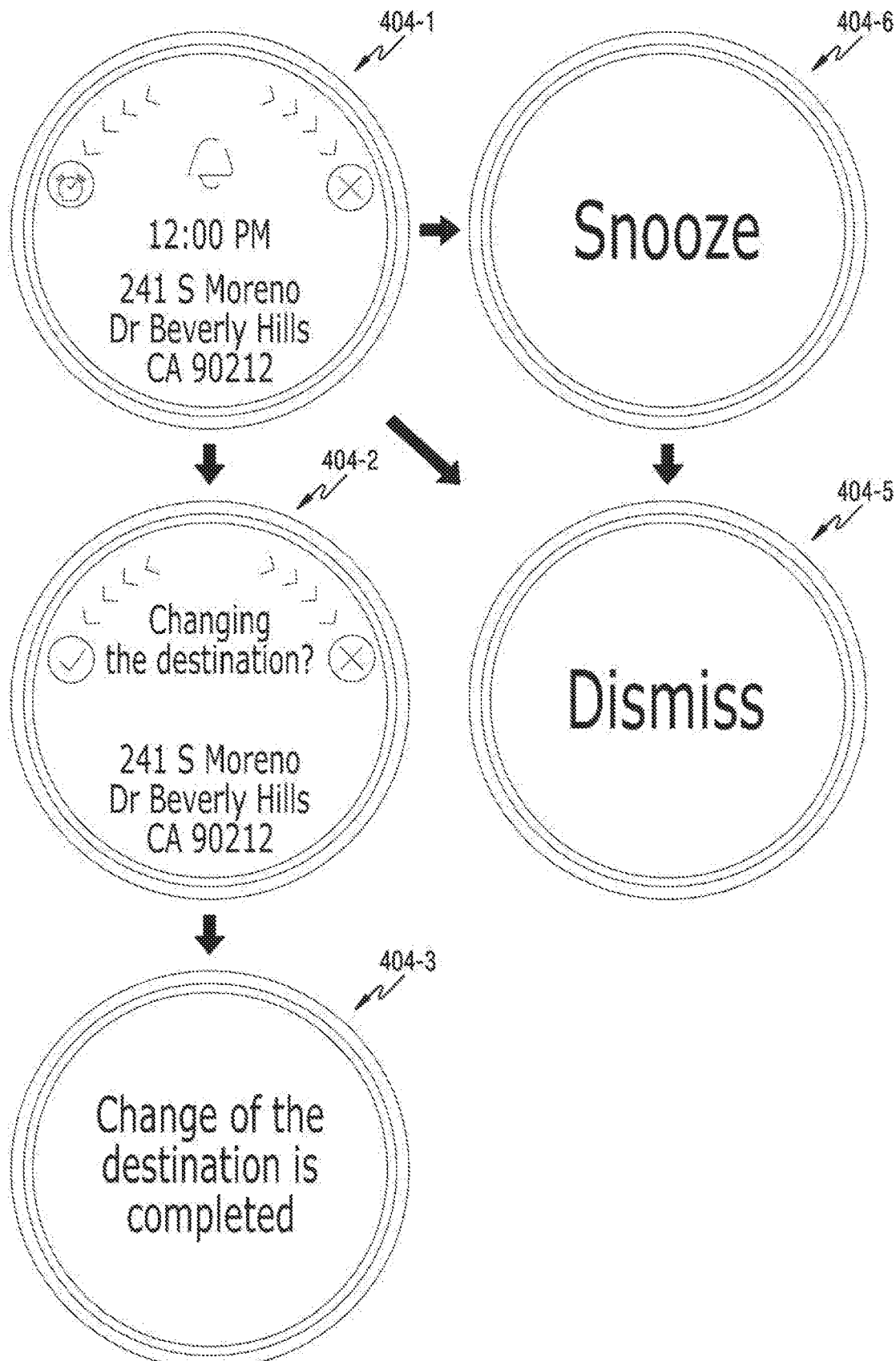

Referring to FIG. 4D, the processor 210 may display, on the display 254 of the input device 110, an indication 404-1 for indicating that a function currently mapped to the input device 110 is provision of an alarm or a notification. The processor 210 may detect a user input to the input device 110 via the input device 110, in the state in which the indication 404-1 is displayed on the display 254.

The processor 210 may provide a service related the notification or the alarm indicated by the indication 404-1 when a user input including a rotational input for rotating the rotatable structure in the second direction is detected by the input device 110. In response to the detection of the user input, the processor 210 may display information 404-2 changed from the indication 404-1, so as to provide the service. For example, the information 404-2 may be used to indicate that changing a destination set in an application for a navigation service from a first destination to a second destination is allowed. The information 404-2 may include at least one visual object for indicating an input method required to change the destination to the second destination (e.g., 241 S Moreno Dr Beverly Hills Calif. 90212).

The processor 210 may change the destination set in the application for the navigation service from the first destination to the second destination, in response to detection of a user input including a rotational input for rotating the rotatable structure in the first direction, in the state in which the information 404-2 is displayed. The processor 210 may display information 404-3 which is changed from the information 404-2, in response to the detection of the user input. The information 404-3 may indicate that changing the destination set in the application for the navigation service is completed.

The processor 210 may maintain the first destination set in the application for the navigation service in response to detection of a user input including a rotational input for rotating the rotatable structure in the second direction in the state in which the information 404-2 is displayed.

The processor 210 may perform a process related to the notification or the alarm indicated by the indication 404-1 when a user input including a rotational input for rotating the rotatable structure in the first direction is detected by the input device 110. For example, the processor 210 may process the notification or the alarm to be dismissed. The processor 210 may display information 404-5 which is changed from the indication 404-1, in response to the detection of the user input. The information 404-5 may indicate that the notification or the alarm is processed to be dismissed.

The processor 210 may perform another process related to the notification or the alarm indicated by the indication 404-1 when a user input including a touch input or a click input on the housing is detected by the input device 110. For example, the processor 210 may process the notification or the alarm using a snooze function. The processor 210 may display information 404-6 which is changed from the indication 404-1, in response to the detection of the user input. The information 404-6 may indicate that the notification or the alarm is processed using the snooze function. The processor 210 may provide again the notification or the alarm via the input device 110 a predetermined period of time after the notification is processed using the snooze function.

Figure 4E:
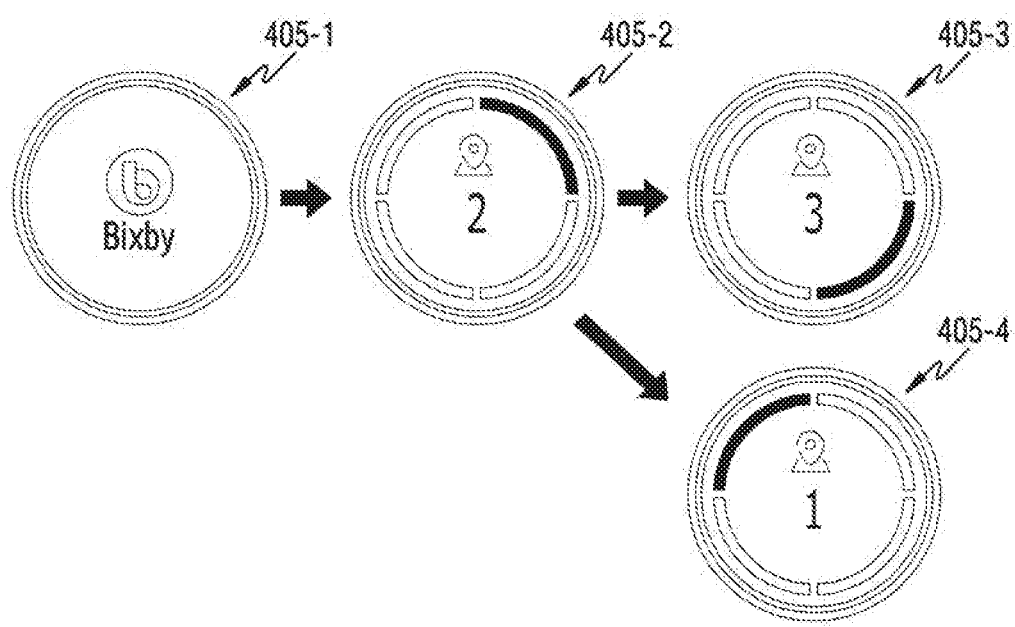

Referring to FIG. 4E, the processor 210 may display, on the display 254 of the input device 110, an indication 405-1 for indicating that a function currently mapped to the input device 110 is a voice recognition service. The processor 210 may detect a user input to the input device 110 by the input device 110, in the state in which the indication 405-1 is displayed on the display 254.

The processor 210 may receive a user input including a voice signal via a microphone (not illustrated) included in the electronic device 125, or a microphone of the vehicle interoperating with the electronic device 125, in the state in which the indication 405-1 is displayed. The voice signal includes the wake-up command and the voice command subsequent to the wake-up command. The voice command may include a command for requesting mapping a function for changing a screen magnification of a navigation to the input device 110. In response to the reception of the user input including the voice signal, the processor 210 may change a function related to the voice recognition service which is currently provided via the input device 110 to the function for changing the screen magnification of the navigation. In other words, the processor 210 may map, to the input device 110, the function for changing the screen magnification of the navigation which is changed from the function related to the voice recognition service.

Based at least on the mapping or the changing, the processor 210 may display, on the display 254 of the input device 110, an indication 405-2 for indicating the function for changing the screen magnification of the navigation is provided via the input device 110. The indication 405-2 may display at least one visual object for representing input methods required for changing the screen magnification.

The processor 210 may increase the screen magnification of the navigation by a designated magnification, in response to the reception of a user input including a rotational input for rotating the rotatable structure in the first direction at a first angle, in the state in which the indication 405-2 is displayed. The processor 210 may display an indication 405-3 for indicating a degree of change in the screen magnification of the navigation, in response to the reception of the user input including the rotational input. The indication 405-3 may be changed from the indication 405-2.

The processor 210 may decrease the screen magnification of the navigation by a designated magnification, in response to the reception of a user input including a rotational input for rotating the rotatable structure in the second direction at a second angle, in the state in which the indication 405-2 is displayed. The processor 210 may display an indication 405-4 for indicating a degree of change in the screen magnification of the navigation, in response to the reception of the user input including the rotational input. The indication 405-4 may be changed from the indication 405-2.

Figure 4F:
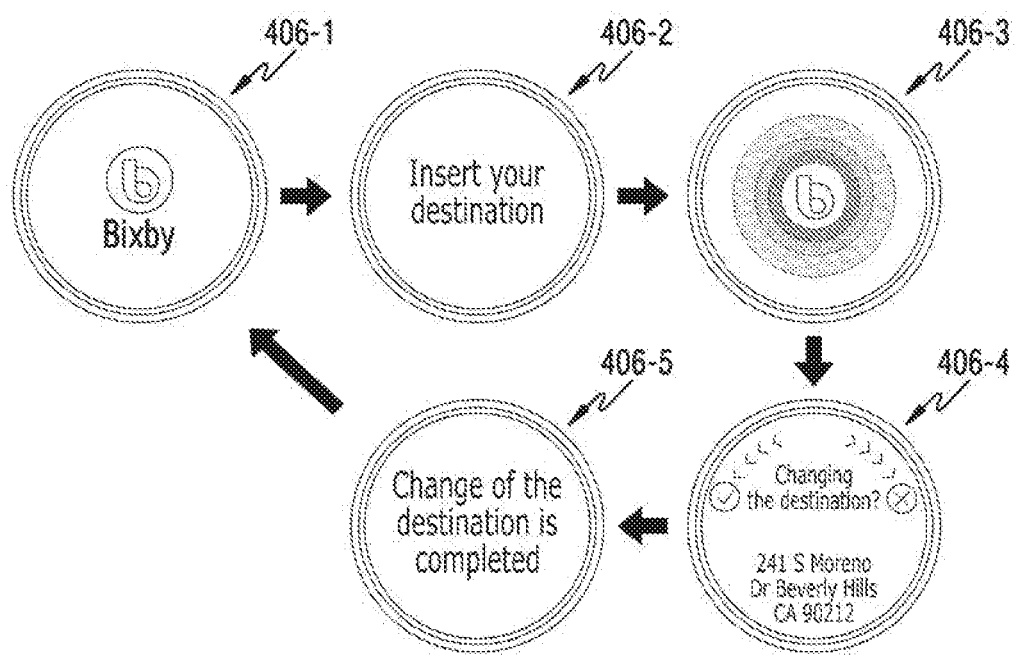

Referring to FIG. 4F, the processor 210 may display, on the display 254 of the input device 110, an indication 406-1 for indicating that a function currently mapped to the input device 110 is a voice recognition service. The processor 210 may detect a user input to the input device 110 via the input device 110, in the state in which the indication 406-1 is displayed on the display 254. The user input may include a voice signal including a wake-up command and a voice command. The voice command may include a command for indicating that inputting (or inserting) a destination for the navigation service is requested.

The processor 210 may display an indication 406-2 which is changed from the indication 406-1, in response to the reception of the voice signal. The indication 406-2 may indicate that setting a destination for the navigation service is allowed.

The processor 210 may receive a user input including another voice signal, in the state in which the indication 406-2 is displayed. The other voice signal may include information (e.g., name or address of a destination) indicating a destination to be inserted or a new destination. The processor 210 may display, on the display 254, an indication 406-3 for indicating that the user input is currently received, while the user input is received. The indication 406-3 may be changed from the indication 406-2.

When the reception of the other voice signal is completed, the processor 210 may display, on the display 254, an indication 406-4 which is changed from the indication 406-3. The indication 406-4 may include information indicating a destination input via the other voice signal, and information for asking whether to insert the destination (or whether to change an existing destination to the destination).

The processor 210 may insert the destination displayed in the indication 406-4 as the destination of the navigation service (or may change the destination of the navigation service to the destination displayed in the indication 406-4), in response to the reception of a rotational input for rotating the rotatable structure in the second direction in the state in which the indication 406-4 is displayed on the display 254. The processor 210 may display, on the display 254, an indication 406-5 for indicating that the destination is changed. The indication 406-5 may be changed from the indication 406-4.

The processor 210 may terminate inserting a destination of the navigation service or may terminate changing a destination of the navigation service, in response to the reception of a rotational input for rotating the rotatable structure in the first direction in the state in which the indication 406-4 is displayed on the display 254.

Figure 4G:
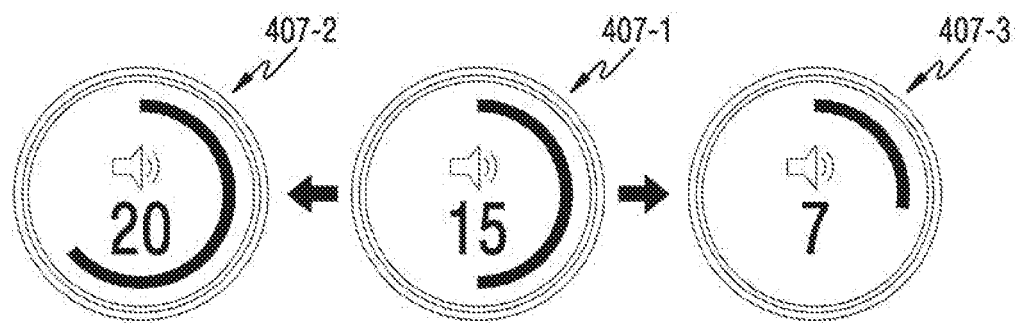

Referring to FIG. 4G, the processor 210 may display, on the display 254 of the input device 110, an indication 407-1 for indicating that a function currently mapped to the input device 110 is controlling the volume of a speaker of the vehicle. The processor 210 may detect a user input to the input device 110 via the input device 110, in the state in which the indication 407-1 is displayed on the display 254.

The processor 210 may increase the volume of the speaker of the vehicle by a degree of rotation of the rotatable structure when a rotational input for rotating the rotatable structure in the first direction is detected via the input device 110. The processor 210 may display, on the display 254, an indication 407-2 which is changed from the indication 407-1, in response to detecting, by the input device 110, the rotational input for rotating the rotatable structure in the first direction. The indication 407-2 may display information for indicating the volume of the speaker of the vehicle which has been increased by the degree of rotation of the rotatable structure.

The processor 210 may decrease the volume of the speaker of the vehicle by a degree of rotation of the rotatable structure when a rotational input for rotating the rotatable structure in the second direction is detected via the input device 110. The processor 210 may display, on the display 254, an indication 407-3 which is changed from the indication 407-1, in response to detecting, by the input device 110, the rotational input for rotating the rotatable structure in the second direction. The indication 407-3 may display information for indicating the volume of the speaker of the vehicle which has been decreased by the degree of rotation of the rotatable structure.

Figure 4H:
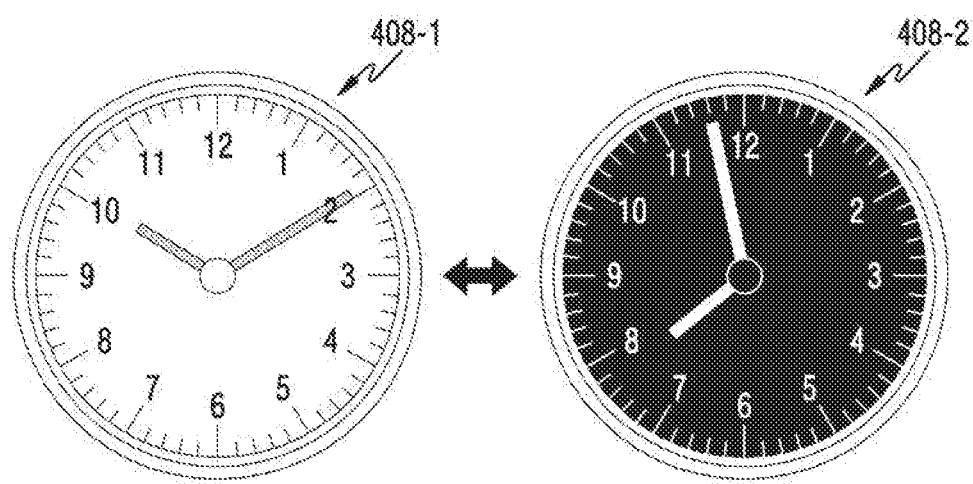

Referring to FIG. 4H, the processor 210 may display, on the display 254 of the input device 110, an indication 408-1 or an indication 408-2 for indicating that a function currently mapped to the input device 110 is provision of the current time. Each of the indication 408-1 and the indication 408-2 may display the current time in the format of an analog watch. According to various embodiments, the indication 408-1 is represented in a first color (e.g., white) so as to indicate that the current time is a.m. (12:00 AM to 11:59 AM), and the indication 408-2 is represented in a second color (e.g., block) so as to indicate that the current time is p.m. (12:00 PM to 11:59 PM). According to various embodiments, the indication 408-1 may be represented in the first color so as to indicate that the current time is included in a time section from sunrise to sunset, and the indication 408-2 may be represented in the second color so as to indicate that the current time is included in a time section from sunset to sunrise. According to various embodiments, when an illuminance value inside the vehicle, which is measured by at least one illuminance sensor located in the vehicle, is greater than or equal to a threshold value, the indication 408-2 may be represented in the second color so as to improve the visibility of the user. The indication 408-1 may be represented in the first color when an illuminance value inside the vehicle, which is measured by the at least one illuminance sensor, is less than or equal to the threshold value.

Figure 4I:
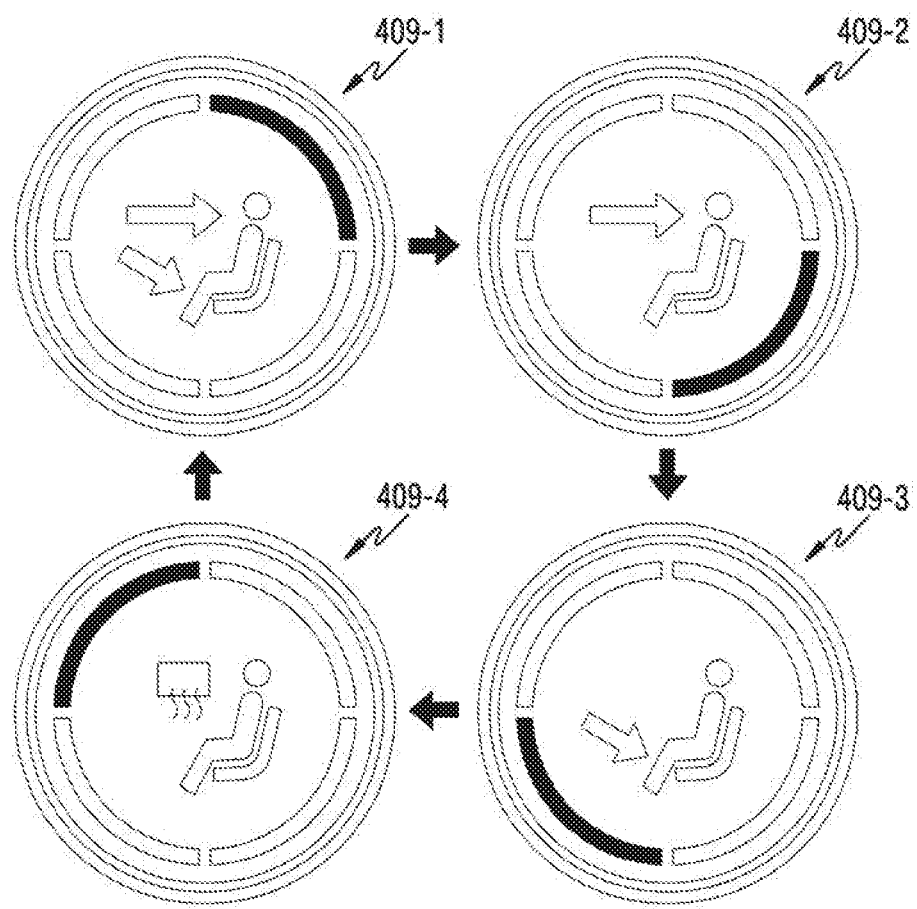
Figure 4J:
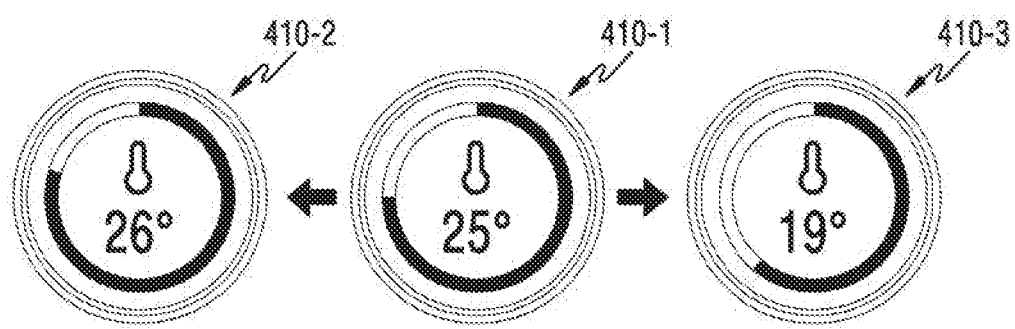

Referring to FIG. 4I, the processor 210 may display, on the display 254 of the input device 110, an indication 409-1 for indicating that a function currently mapped to the input device 110 is changing a wind direction mode of the air conditioner of the vehicle. The indication 409-1 may indicate that the wind direction mode of the air conditioner of the vehicle is a first mode. The processor 210 may detect a user input to the input device 110 via the input device 110, in the state in which the indication 409-1 is displayed on the display 254 of the input device 110.

The processor 210 may display an indication 409-2 which is changed from the indication 409-1, on the display 254 based on the detection of a user input including a rotational input for rotating the rotatable structure in the first direction at a first angle, in the state in which the indication 409-1 is displayed. The indication 409-2 may indicate that the wind direction mode of the air conditioner of the vehicle is a second mode, which is different from the first mode. The processor 210 may change the wind direction mode of the air conditioner of the vehicle to the second mode, based on the detection of the user input including the rotational input.

The processor 210 may display an indication 409-3 which is changed from the indication 409-2, based on the detection of a user input including a rotational input for rotating the rotatable structure in the first direction at a second angle, in the state in which the indication 409-2 is displayed. The indication 409-3 may indicate that the wind direction mode of the air conditioner of the vehicle is a third mode, which is different from the second mode. The processor 210 may change the wind direction mode of the air conditioner of the vehicle to the third mode, based on the detection of the user input including the rotational input.

The processor 210 may display an indication 409-4 which is changed from the indication 409-3, based on the detection of a user input including a rotational input for rotating the rotatable structure in the first direction at a third angle, in the state in which the indication 409-3 is displayed. The indication 409-4 may indicate that the wind direction mode of the air conditioner of the vehicle is a fourth mode, which is different from the third mode. The processor 210 may change the wind direction mode of the air conditioner of the vehicle to the fourth mode, based on the detection of the user input including the rotational input.

The processor 210 may display the indication 409-1 which is changed from the indication 409-4, based on the detection of a user input including a rotational input for rotating the rotatable structure in the first direction at a fourth angle, in the state in which the indication 409-4 is displayed. The processor 210 may change the wind direction mode of the air conditioner of the vehicle to the first mode, based on the detection of the user input including the rotational input.

Referring to FIG. 4I, an example of changing an indication displayed on the display 254 of the input device 110, based on a rotational input for rotating the rotatable structure in the first direction is illustrated, but this is merely for ease of description. The electronic device 125 may change the representation of the indication based on another rotational input for rotating the rotatable structure in the second direction which is different from the first direction.

The processor 210 may display, on the display 254 of the input device 110, an indication 410-1 for indicating that a function currently mapped to the input device 110 is controlling the temperature inside the vehicle. The processor 210 may detect a user input to the input device 110 via the input device 110, in the state in which the indication 410-1 is displayed via the display 254.

The processor 210 may display an indication 410-2 which is changed from the indication 410-1 when a user input including a rotational input for rotating the rotatable structure in the first direction is detected by the input device 110. Based on the detection of the user input, the processor 210 may increase the temperature inside the vehicle by a degree of rotation of the rotatable structure rotated by the user input.

The processor 210 may display an indication 410-3 which is changed from the indication 410-1 when a user input including a rotational input for rotating the rotatable structure in the second direction is detected by the input device 110. Based on the detection of the user input, the processor 210 may decrease the temperature outside the vehicle by a degree of rotation of the rotatable structure rotated by the user input.

Figure 4K:
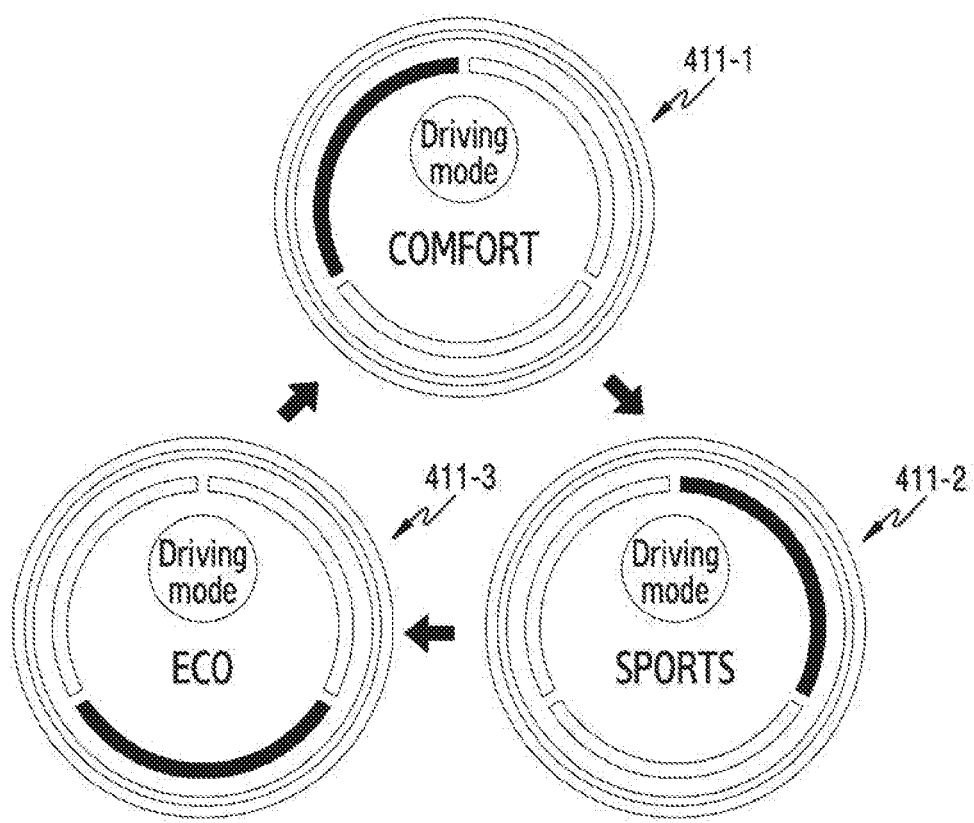

Referring to FIG. 4K, the processor 210 may display, on the display 254 of the input device 110, an indication 411-1 for indicating that a function currently mapped to the input device 110 is controlling a driving mode. The indication 411-1 may indicate that the current driving mode of the vehicle is a comfort mode. The processor 210 may detect a user input to the input device 110 via the input device 110, in the state in which the indication 411-1 is displayed on the display 254.

The processor 210 may display an indication 411-2 which is changed from the indication 411-1 when a user input including a rotational input for rotating the rotatable structure in the first direction at a first angle is detected by the input device 110. The indication 411-2 may indicate that the current driving mode of the vehicle is a sports mode. Based on the detection of the user input, the processor 210 may change the driving mode of the vehicle from the comfort mode to the sports mode.

The processor 210 may display an indication 411-3 which is changed from the indication 411-2 when a user input including a rotational input for rotating the rotatable structure in the first direction at the first angle is detected by the input device 110 in the state in which the indication 411-2 is displayed. The indication 411-3 may indicate that the current driving mode of the vehicle is an eco mode. Based on the detection of the user input, the processor 210 may change the driving mode of the vehicle from the sports mode to the eco mode.

Figure 4L:
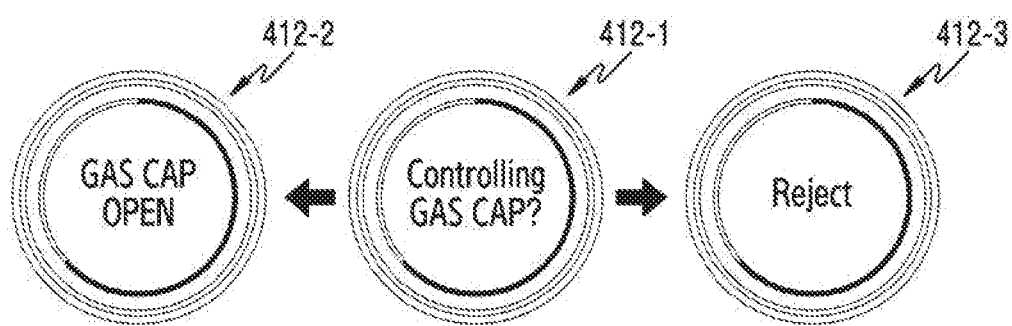

Referring to FIG. 4L, the processor 210 may display, on the display 254 of the input device 110, an indication 412-1 for indicating that a function currently mapped to the input device 110 is controlling a gas cap. The processor 210 may detect a user input to the input device 110 via the input device 110, in the state in which the indication 412-1 is displayed The processor 210 may display an indication 412-2 which is changed from the indication 412-1 when a user input including a rotational input for rotating the rotatable structure in the first direction is detected by the input device 110. The processor 210 may open the gas cap of the vehicle when the user input is detected by the input device 110.

The processor 210 may display an indication 412-3 which is changed from the indication 412-1 on the display 254 when a user input including a rotational input for rotating the rotatable structure in the second direction is detected by the input device 110. The processor 210 may maintain the gas cap of the vehicle to be closed when the user input is detected by the input device 110.

Figure 5:
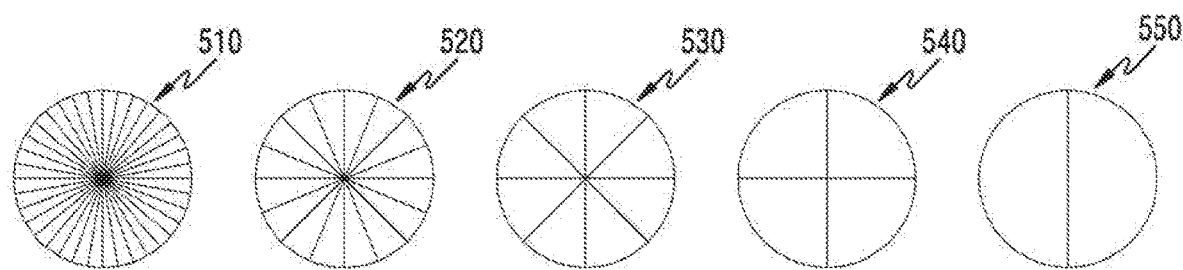
FIG. 5 is a diagram illustrating examples of input values used in an input device according to various embodiments of the disclosure.

FIG. 5 is a diagram illustrating examples of input values used in an input device according to various embodiments of the disclosure.

Referring to FIG. 5, the processor 210 may set data for processing an input detected by the input device 110, so as to control the at least one function mapped to the input device 110. For example, the processor 210 may set the data so as to determine (or identify) a service indicated by the input detected by the input device 110, from among a plurality of services (or plurality of states) related to the function mapped to the input device 110. The data may be configured with a plurality of input values. The plurality of input values may be set to be different based on a function mapped to the input device 110. For example, when function A is mapped to the input device 110, the processor 210 may divide the maximum angle range (e.g., 0 to 360 degrees) of a rotational input into 36 angle ranges based on a division degree 510, and sets the plurality of input values for the 36 angle ranges, respectively. When function B is mapped to the input device 110, the processor 210 may divide the maximum angle range of a rotational input into 16 angle ranges based on a division degree 520, and sets the plurality of input values for the 16 angle ranges, respectively. When function C is mapped to the input device 110, the processor 210 may divide the maximum angle range of a rotational input into 8 angle ranges based on a division degree 530, and sets the plurality of input values for the 8 angle ranges, respectively. When function D is mapped to the input device 110, the processor 210 may divide the maximum angle range of a rotational input into 4 angle ranges based on a division degree 540, and sets the plurality of input values for the 4 angle ranges, respectively. When function E is mapped to the input device 110, the processor 210 may divide the maximum angle range of a rotational input into 2 angle ranges based on a division degree 550, and sets the plurality of input values for the 2 angle ranges, respectively.

Each of the plurality of input values may be allocated based on a degree of rotation of the rotatable structure rotated by the rotational input. For example, the plurality of input values may be configured based on a database as shown in Table 1.

TABLE 1

| Function | Attributes | Plurality of input values | |
|---|---|---|---|
| | | Change in angle | Input values |
| Sending emergency call | 1 | 0 to 179 degrees | $a_1$ |
| | | 180 to 359 degrees | $a_2$ |
| Reception of incoming call | 2 | 0 to 179 degrees | $b_1$ |
| | | 180 to 359 degrees | $b_2$ |
| | | none | $b_3$ |
| Reception of message | 2 | 0 to 179 degrees | $c_1$ |
| | | 180 to 359 degrees | $c_2$ |
| | | none | $c_3$ |
| Control of volume | 1 | 0 to 29 degrees | $d_1$ |
| | | 30 to 59 degrees | $d_2$ |
| | | ... | ... |
| | | 330 to 359 degrees | $d_{12}$ |
| Control of wind direction mode | 1 | 0 to 89 degrees | $e_1$ |
| | | 90 to 179 degrees | $e_2$ |
| | | 180 to 269 degrees | $e_3$ |
| | | 270 to 359 degrees | $e_4$ |
| Control of temperature | 1 | 0 to 14 degrees | $f_1$ |
| | | 15 to 29 degrees | $f_2$ |
| | | ... | ... |
| | | 345 to 359 degrees | $f_{24}$ |
| ... | | | |

In Table 1, "function" indicates a function mapped to the input device 110. "plurality of input values" indicate input values associated with a function mapped to the input device 110. "attribute" indicates the attribute of an input detected via the input device 110. "change in angle" indicates a degree of rotation of the rotatable structure of the input device 110. "input value" indicates a value for determining the relationship between an input detected by the input device 110 and services related to a function mapped to the input device 110. In Table 1, when "attribute" is "1", this indicates that an input defined for a function mapped to the input device 110 is defined by only an input to the rotatable structure. When "attribute" is "2", this indicates that an input defined for a function mapped to the input device 110 is defined by an input to the rotatable structure and an input to the housing.

According to various embodiments, the processor 210 may search (or retrieve a value from) a database such as Table 1 using information associated with an input (e.g., an input value from among the plurality of input values) received from the input device 110, whereby the processor 210 may determine a service related to the function indicated by the input detected by the input device 110. The information associated with the input may be configured with one value (e.g., $c_1$ or $c_3$) from among the plurality of values listed in Table 1, or may be configured with a value for indicating a degree of rotation of the rotatable structure (e.g., 130 degrees) and/or a value for indicating whether the housing is depressed.

For example, when the information associated with the input is configured with one of the plurality of values, the processor 210 may insert data related to the "plurality of values" of Table 1 to the configuration information every time that a function mapped to the input device 110 is changed, and may provide the configuration information including the inserted data to the input device 110. For example, when the function mapped to the input device 110 is "reception of a message", the data indicates an attribute of "2", and indicates that a rotation of 0 to 179 degrees of a rotatable structure is allocated to an input value $c_1$, a rotation of 180 to 359 degrees of the rotatable structure is allocated to an input value $c_2$, and a depression on a housing is allocated to an input value $c_3$.

As another example, when the information associated with the input is configured with a value indicating the information associated with rotation of the rotatable structure and/or a value indicating whether the housing is depressed, the processor 210 may retrieve a value received from the input device 110 from the database such as Table 1, and may determine a service indicated by the input.

According to various embodiments, the processor 210 may provide a haptic effect via the housing or the rotatable structure, based on an input detected by the input device 110. For example, the processor 210 may provide a haptic effect so as to provide a user with the feel of division, based on a degree of rotation of the rotatable structure rotated by the rotational input.

Figure 6:
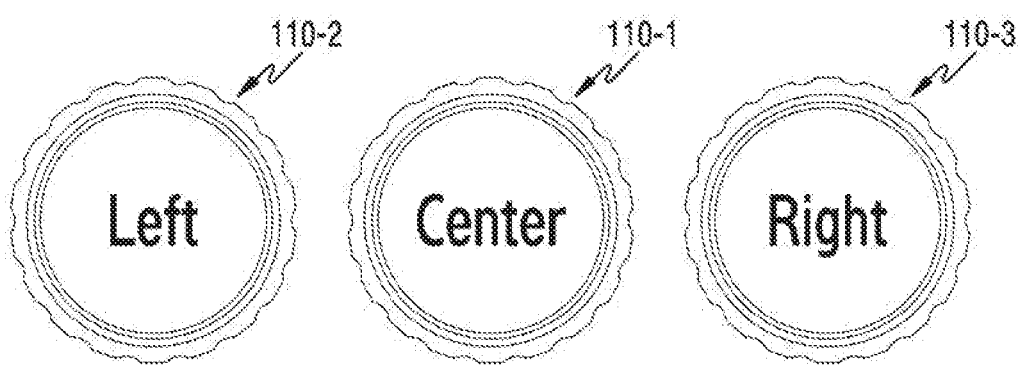
FIG. 6 is a diagram illustrating an example of a combination of input devices according to various embodiments of the disclosure.

FIG. 6 is a diagram illustrating an example of a combination of input devices according to various embodiments of the disclosure.

Referring to FIG. 6, the input device 110 may be embodied as a plurality of devices. For example, the input device 110 may be embodied as a plurality of devices, such as an input device 110-1, an input device 110-2, and an input device 110-3. In this instance, the input device 110-1, the input device 110-2, and the input device 110-3 may perform different functions from each other. The input device 110-1, the input device 110-2, and the input device 110-3 may be disposed in different locations. For example, the input device 110-1 may be attached to a first area in the center fascia of the vehicle. The input device 110-2 may be attached to a second area in the center fascia of the vehicle. The input device 110-3 may be attached to a third area in the center fascia of the vehicle. As another example, the input device 110-1 may be disposed between the input device 110-2 and the input device 110-3. The input device 110-2 may be disposed to the left of the input device 110-1. The input device 110-3 may be disposed to the right of the input device 110-1.

Different functions may be mapped to the input device 110-1, the input device 110-2, and the input device 110-3. For example, the input device 110-1 may be mapped to function A. The input device 110-2 may be mapped to function B which is different from function A. The input device 110-3 may be mapped to function C which is different from function A and function B.

The processor 210 may control each of the input device 110-1, the input device 110-2, and the input device 110-3 embodied as the plurality of devices.

According to various embodiments, the processor 210 may determine a context related to the vehicle using data, instructions, signals, or information used by the processor 210. For example, when an application for a navigation service is executed by the processor 210, the processor 210 may determine a context of executing the application for the navigation service as the context related to the vehicle. As another example, when music is output by the processor 210, the processor 210 may determine a context of reproducing music as the context related to the vehicle.

According to various embodiments, the processor 210 may determine a context related to the vehicle using data, instructions, signals, or information obtained from an external electronic device. For example, when data related to reception of an incoming call is received via the interface 230 from an external electronic device (e.g., a smart phone) interoperating with the electronic device 125, the processor 210 may determine a context of receiving the incoming call in the vehicle as the context related to the vehicle.

According to various embodiments, the processor 210 may determine a context related to the vehicle using data, instructions, signals, or information obtained from another electronic device embedded in the vehicle. For example, when information indicating that the speed of the vehicle is rapidly changed or an impact greater than or equal to a predetermined impact is transmitted to the vehicle is received via the interface 230 from at least one sensor embedded in the vehicle, the processor 210 may determine a traffic accident as the context related to the vehicle.

According to various embodiments, the processor 210 may determine a context related to the vehicle based on one or more from among data used by the processor 210, data obtained from an external electronic device, or data obtained from another electronic device embedded in the vehicle. For example, the processor 210 may determine a traffic accident as the context related to the vehicle, based on one or more from among data associated with a place of frequent accidents which is provided from a server, image data associated with a vehicle and surroundings of the vehicle which are obtained via a camera embedded in the vehicle, and data indicating an impact related to the vehicle which is obtained via at least one sensor embedded in the vehicle. As another example, the processor 210 may determine a context in which a path set for a navigation service needs to be changed, as the context related to the vehicle, based at least on information associated with the time expended for arriving a destination which is obtained from an application for the navigation service executed by the processor 210, external traffic information obtained from a server, and schedule information related to the current time which is obtained from an external electronic device (e.g., a smart phone). As another example, the processor 210 may determine a context in which the state of a window of the vehicle or the state of the wipers of the vehicle need to be changed as the context related to the vehicle, based on at least one of external weather information obtained from the server and information associated with an environment where the vehicle is located which is obtained via at least one sensor embedded in the vehicle. As another example, the processor 210 may determine a context in which a notification needs to be provided in the vehicle as the context related to the vehicle, based on learning data obtained via a cloud server and schedule data obtained from an external electronic device (e.g., a smart phone) interoperating with the electronic device 125. As another example, the processor 210 may determine a context in which the gas cap needs to be opened to refuel the vehicle as the context related to the vehicle, based on one or more from among data associated with the amount of gas put into the vehicle which is obtained from at least one sensor embedded in the vehicle, data associated with the location of the vehicle which is obtained from the at least one sensor, data obtained from an application for a navigation service which is executed by the processor 210, or data indicating the state of the gear of the vehicle (e.g., parking) which is obtained from the at least one sensor.

Methods of processing a plurality of contexts by the processor 210 in parallel will be described later.

According to various embodiments, the processor 210 may determine a function to be mapped to the input device 110, based on the determined context. For example, when it is determined that a traffic accident is the context related to the vehicle, the processor 210 may map, to the input device 110, a function related to sending an emergency call from among a plurality of functions of the vehicle which are controllable by the input device 110. As another example, when a context that requires processing a notification is determined as the context related to the vehicle, the processor 210 may map, to the input device 110, a function of changing a destination of a navigation service to a destination related to the notification from among the plurality of functions. In other words, the processor 210 may adaptively change the function of the input device 110 based on a change of the context related to the vehicle.

According to various embodiments, the processor 210 may determine a function to be mapped to the input device 110, based on a user input.

Figure 7:
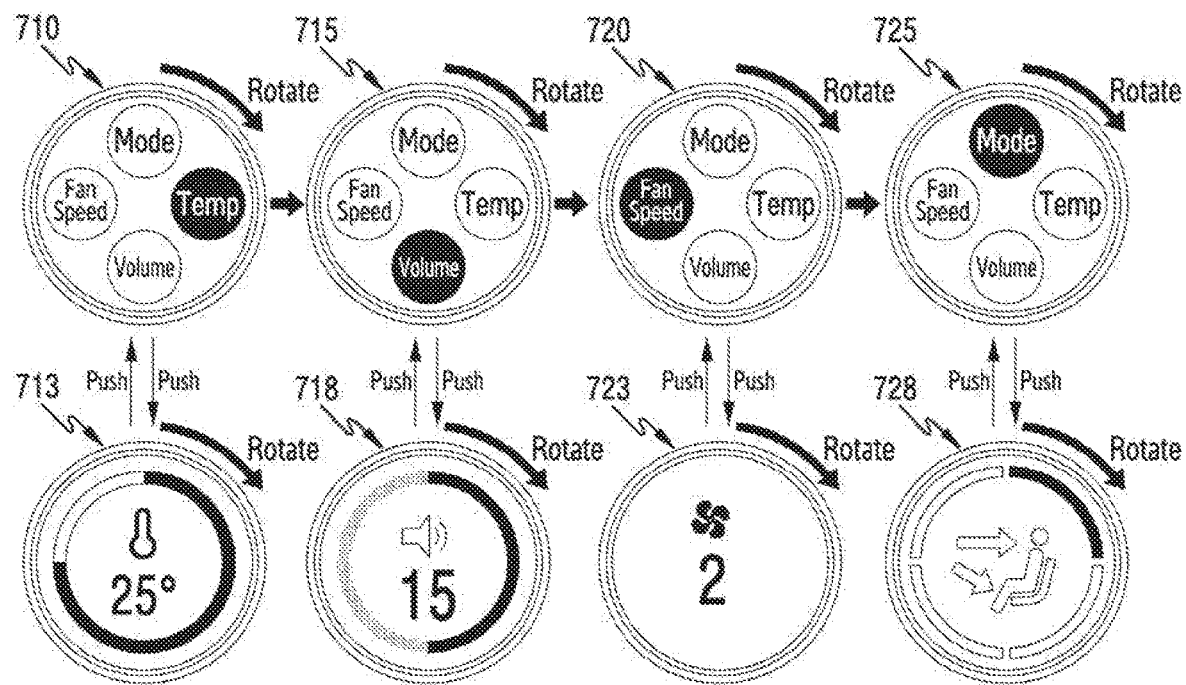
FIG. 7 is a diagram illustrating examples of a change in a setting of an input device according to various embodiments of the disclosure.

FIG. 7 is a diagram illustrating examples of a change in a setting of an input device according to various embodiments of the disclosure.

Referring to FIG. 7, the processor 210 may detect, via the input device 110, a click input or a touch input on the housing of the input device, in the state in which a default function is mapped to the input device 110. The processor 210 may display an indication 710 on the display 254 in response to detection of the click input or the touch input. The indication 710 may display a plurality of visual objects for indicating a plurality of functions which may be mapped to the input device 110. For example, the indication 710 may include a first visual object for representing a function of changing a wind direction mode of the air conditioner of the vehicle, a second visual object for representing a function of changing the temperature inside the vehicle, a third visual object for representing a function of controlling the volume of the speaker of the vehicle, and a fourth visual object for representing a function of changing the wind speed or the air volume of the air conditioner of the vehicle. The processor 210 may detect a rotational input for rotating the rotatable structure of the input device 110, via the input device 110. The processor 210 may rotationally display the indication 710, an indication 715, an indication 720, and an indication 725 based on a degree of rotation of the rotatable structure.

The processor 210 may identify that a visual object indicated by the degree of rotation of the rotatable structure is the second visual object from among the plurality of visual objects. In response to the identification, the processor 210 may map, to the input device 110, a function of changing the temperature inside the vehicle. The processor 210 may display, on the display 254 of the input device 110, an indication 713 for representing that the input device 110 is capable of changing the temperature inside the vehicle. The indication 713 may be changed from the indication 710. In the state in which the indication 713 is displayed on the display 254, the processor 210 may monitor whether a rotational input on the rotatable structure is detected. When the result of monitoring shows that the rotational input on the rotatable structure is detected, the processor 210 may change the temperature inside the vehicle, based on the rotational input.

The processor 210 may identify that a visual object indicated by the degree of rotation of the rotatable structure is the third visual object from among the plurality of visual objects. In response to the identification, the processor 210 may map, to the input device 110, a function of controlling the volume of the speaker of the vehicle. In response to the identification, the processor 210 may display, on the display 254 of the input device 110, an indication 718 which is changed from the indication 715. The indication 718 may indicate that the input device 110 is capable of controlling the volume of the speaker of the vehicle. In the state in which the indication 718 is displayed on the display 254, the processor 210 may monitor whether a rotational input on the rotatable structure is detected. When the result of monitoring shows that the rotational input on the rotatable structure is detected, the processor 210 may control the volume of the speaker of the vehicle, based on the rotational input.

The processor 210 may identify that a visual object indicated by the degree of rotation of the rotatable structure is the fourth visual object from among the plurality of visual objects. In response to the identification, the processor 210 may map, to the input device 110, a function of changing the wind speed or the air volume of the air conditioner of the vehicle. In response to the identification, the processor 210 may display, on the display 254 of the input device 110, an indication 723 which is changed from the indication 720. The indication 723 may indicate that the input device 110 is capable of changing the wind speed or the air volume of the air conditioner of the vehicle. In the state in which the indication 723 is displayed on the display 254, the processor 210 may monitor whether a rotational input on the rotatable structure is detected. When the result of monitoring shows that the rotational input on the rotatable structure is detected, the processor 210 may change the wind speed or the air volume of the air conditioner of the vehicle, based on the rotational input.

The processor 210 may identify that a visual object indicated by the degree of rotation of the rotatable structure is the first visual object from among the plurality of visual objects. In response to the identification, the processor 210 may map, to the input device 110, a function of changing a wind direction mode of the air conditioner of the vehicle. In response to the identification, the processor 210 may display, on the display 254 of the input device 110, an indication 728 which is changed from the indication 725. The indication 728 may indicate that the input device 110 is capable of changing the wind direction mode of the air conditioner of the vehicle. In the state in which the indication 728 is displayed on the display 254, the processor 210 may monitor whether a rotational input on the rotatable structure is detected. When the result of monitoring shows that the rotational input on the rotatable structure is detected, the processor 210 may change the wind direction mode of the air conditioner of the vehicle, based on the rotational input.

Figure 8:
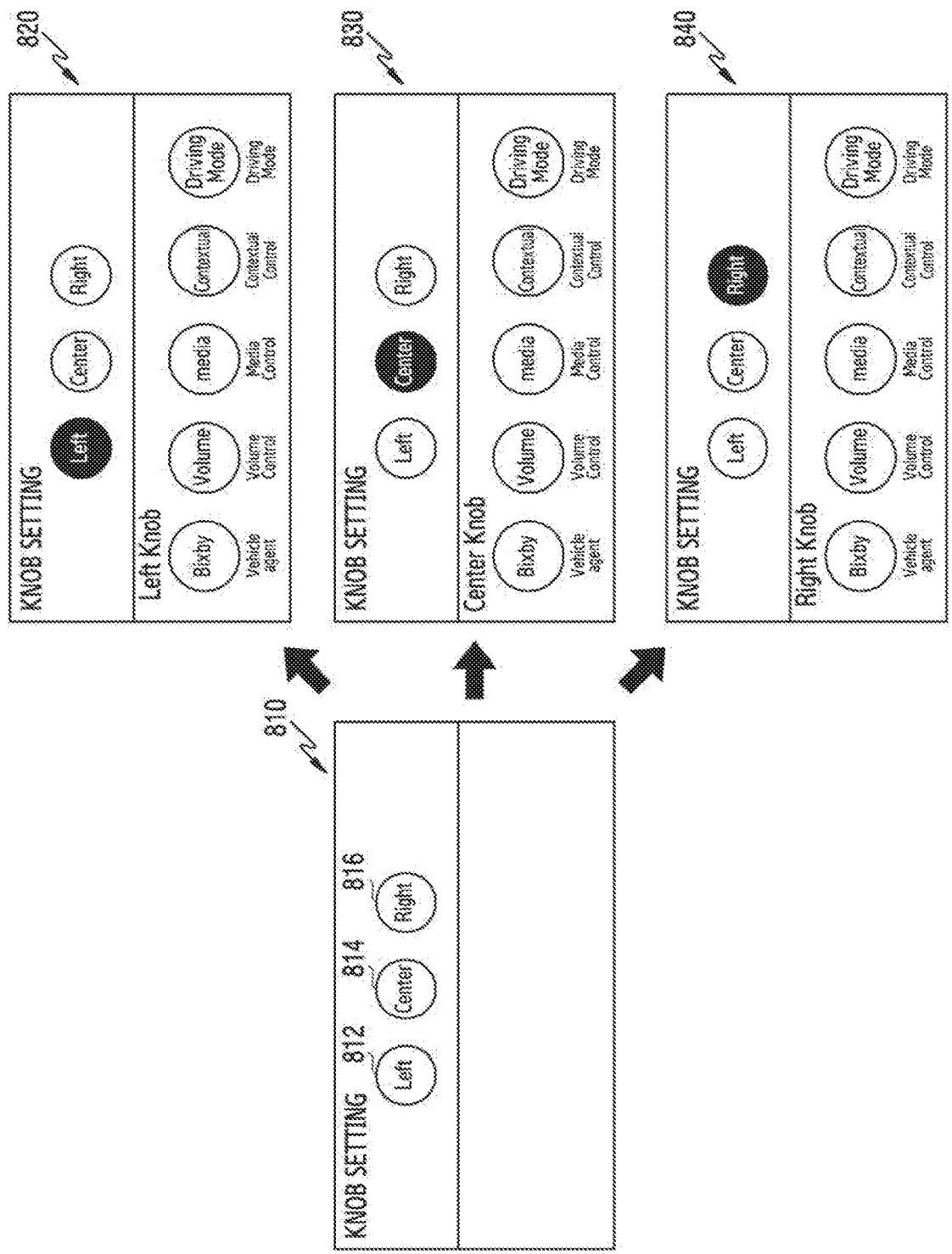
FIG. 8 is a diagram illustrating an example of a user interface that changes a setting of an input device according to various embodiments of the disclosure.

FIG. 8 is a diagram illustrating an example of a user interface that changes a setting of an input device according to various embodiments of the disclosure.

Referring to FIG. 8, the processor 210 may display a user interface (UI) 810 for setting a function to be mapped to the input device 110, on the display 240 of the electronic device 125 or on a display of another electronic device (e.g., a smart phone) interoperating with the electronic device 125. The UI 810 may include a plurality of objects including an object 812, an object 814, and an object 816 for indicating a plurality of input devices, such as the input device 110-2, the input device 110-1, and the input device 110-3 as illustrated in FIG. 6. The plurality of input devices may be referred to as knobs.

The processor 210 may detect a user input for selecting one of the plurality of objects in the state in which the UI 810 is displayed. When the UI 810 is displayed on the display of the other electronic device, the user input may be detected by a processor of the other electronic device. Hereinafter, the operation of the processor 210 may be replaced with the operation of the processor of the other electronic device.

When a user input on the object 812 from among the plurality of objects is detected, the processor 210 may display a UI 820 which is changed from the UI 810. In the UI 820, the processor 210 may highlight the object 812 relative to the object 814 and the object 816, so as to indicate that the input device 110-2 is selected to map a function. The processor 210 may display, in the UI 820, a plurality of objects to indicate a plurality of functions which are capable of being mapped to the input device 110-2. The processor 210 may configure a function to be mapped to the input device 110-2, based on detection of an input for connecting the object 812 and at least one of the plurality of objects.

When a user input on the object 814 from among the plurality of objects is detected, the processor 210 may display a UI 830 which is changed from the UI 810 or the UI 820. In the UI 830, the processor 210 may highlight the object 814 relative to the object 812 and the object 816, so as to indicate that the input device 110-1 is selected to map a function. The processor 210 may display, in the UI 830, a plurality of objects to indicate a plurality of functions which are capable of being mapped to the input device 110-1. The processor 210 may configure a function to be mapped to the input device 110-1, based on detection of an input for connecting the object 814 and at least one of the plurality of objects.

When a user input on the object 816 from among the plurality of objects is detected, the processor 210 may display a UI 840 which is changed from the UI 810, the UI 820 or the UI 830. In the UI 840, the processor 210 may highlight the object 816 relative to the object 812 and the object 814, so as to indicate that the input device 110-3 is selected to map a function. The processor 210 may display, in the UI 840, a plurality of objects to indicate a plurality of functions which are capable of being mapped to the input device 110-3. The processor 210 may configure a function to be mapped to the input device 110-3, based on detection of an input for connecting the object 816 and at least one of the plurality of objects.

According to various embodiments, the processor 210 may display guide information on the display 240 or a head up display (HUD) interoperating with the electronic device 125, wherein the guide information is used to provide guidance associated with how a state related to the function mapped to the input device 110 changes based on a user input on the input device 110. For example, the processor 210 may display, on the display 240 or the HUD interoperating with the electronic device 125, information indicating a degree of rotation of the rotatable structure rotated by a rotational input as the guide information. The guide information may be displayed on the HUD or on the display 240 distinguished from the display 254 so that a user who has a limited field of view (FOV) due to driving intuitively causes an input. The guide information may correspond to the information displayed on the display 254 of the input device 110.

Figure 9A:
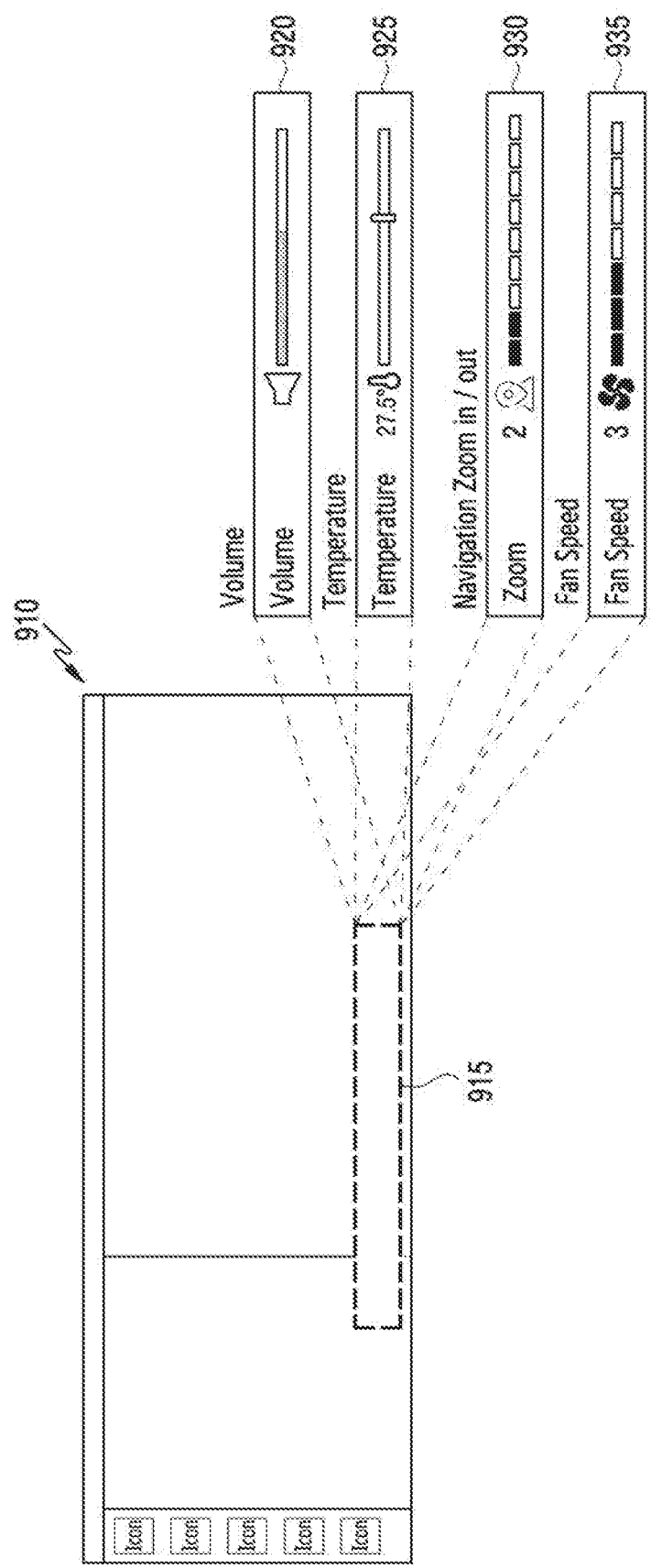
FIG. 9A is a diagram illustrating an example of information that provides guidance associated with an input to an input device displayed on a display of an electronic device according to various embodiments of the disclosure.

FIG. 9A is a diagram illustrating an example of information that provides guidance associated with an input to an input device displayed on a display of an electronic device according to various embodiments of the disclosure.

Referring to FIG. 9A, the processor 210 may display a UI 910 on the display 240. The UI 910 may display an execution screen of an application that is currently executed in the vehicle. For example, the UI 910 may display an execution screen of an application for a navigation service which is currently executed in the vehicle. As another example, the UI 910 may display an execution screen of an application for providing information indicating states of a plurality of functions of the vehicle. As another example, the UI 910 may display an execution screen of an application for reproducing music in the vehicle.

While the UI 910 is displayed on the display 240, the processor 210 may detect a user input on the input device 110 to which a predetermined function is mapped. The processor 210 may update the representation of the display 254 of the input device 110 based on the user input. The processor 210 may display guide information 915 in response to detection of the user input. The guide information 915 may indicate a degree of rotation of the rotatable structure rotated by the user input. The guide information 915 may correspond to an update of the representation of the display 254 of the input device 110. For example, when a function of controlling the volume of a speaker of the vehicle is mapped to the input device 110, the guide information 915 may include an object 920. The object 920 may include text and a figure for indicating that the volume of the speaker of the vehicle is currently controlled, and a status bar for indicating the level of the volume of the speaker of the vehicle which is controlled by the detected user input. As another example, when a function of controlling the temperature inside the vehicle is mapped to the input device 110, the guide information 915 may include an object 925. The object 925 may include text and a figure for indicating that the temperature inside the vehicle is currently controlled, and a status bar for indicating the setting of the temperature inside the vehicle which is controlled by the detected user input. As another example, when a function of controlling the screen magnification of a navigation which is currently executed in the vehicle is mapped to the input device 110, the guide information 915 may include an object 930. The object 930 may include text and a figure for indicating that the screen magnification of the navigation is currently controlled, and a status bar for indicating the screen magnification which is currently changed by the detected user input. As another example, when a function of changing the wind speed of the air conditioner of the vehicle is mapped to the input device 110, the guide information 915 may include an object 935. The object 935 may include text and a figure for indicating that the wind speed of the air conditioner of the vehicle is currently controlled, and a status bar for indicating the wind speed of the air conditioner of the vehicle which is changed by the detected user input. The guide information may overlap the UI 910.

Figure 9B:
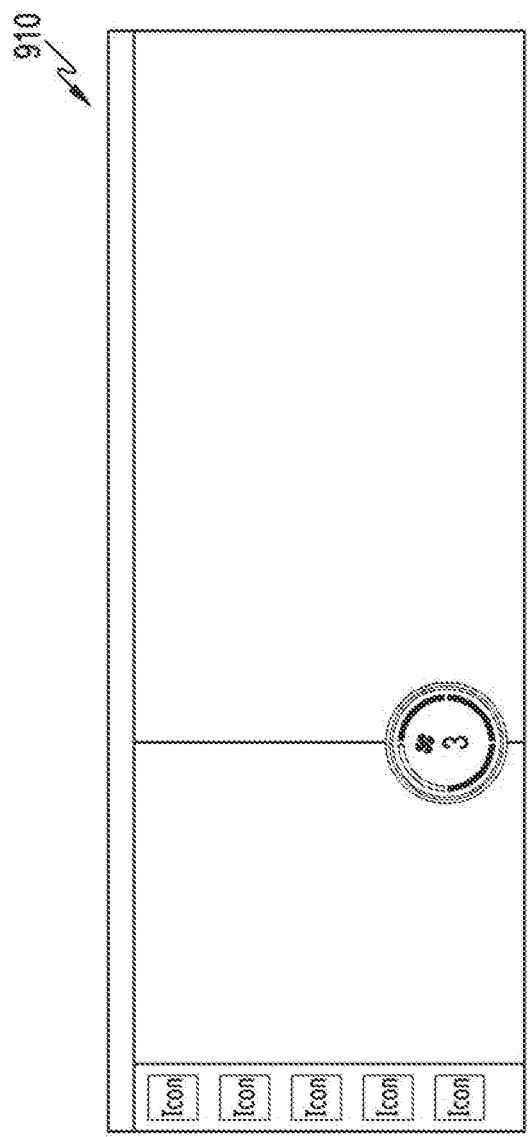
FIG. 9B is a diagram illustrating another example of information that provides guidance associated with an input to an input device displayed on a display of an electronic device according to various embodiments of the disclosure.

FIG. 9B is a diagram illustrating another example of information that provides guidance associated with an input to an input device displayed on a display of an electronic device according to various embodiments of the disclosure.

Referring to FIG. 9B, the processor 210 may display the UI 910 on the display 240. While the UI 910 is displayed on the display 240, the processor 210 may detect a user input on the input device 110 to which a predetermined function is mapped. The processor 210 may display the representation of the display 254 of the input device 110 in response to the detection of the user input. The shape of the representation of the display 254 of the input device 110 may correspond to the shape of the display 254 of the input device 110. The representation of the display 254 of the input device 110 may be updated as the state of the representation of the display 254 of the input device 110 changes. For example, when a function of controlling the wind speed of the air conditioner of the vehicle is mapped to the input device 110, the representation of the display 254 of the input device 110, which is displayed as guide information, may include an object for indicating that the wind speed of the air conditioner of the vehicle is currently controlled by the input device 110, and an object indicating the relative level of a wind speed that is currently controlled by the input device 110.

According to various embodiments, the processor 210 may process a context related to the vehicle based on a priority allocated for each context. It is assumed that an incoming call is received from an external electronic device at a moment when the vehicle has an accident. In this instance, the processor 210 may determine a context in which the vehicle has a traffic accident and a context in which an incoming call is received by the vehicle, as the context related to the vehicle. In this instance, the processor 210 may process the context related to the vehicle based on a priority. In other words, when the context related to the vehicle is related to a first context and a second context, the processor 210 may determine the order of the first context and the second context to be processed, based on the priority of the first context and the priority of the second context. For example, the processor 210 may determine the order of a plurality of contexts related to the vehicle to be processed, based on a database such as Table 2 provided below.

TABLE 2

| Context determined by electronic device | priority |
|---|---|
| Emergency | $A_1$ (highest) |
| Change setting of navigation | $A_2$ |
| Display pop-up message based on event | $A_3$ |
| Display notification or alarm | $A_4$ |
| . . . | . . . |
| Control gas cap button | $A_k$ |
| . . . | . . . |
| Default | $A_n$ (lowest) |

In Table 2, "context determined by electronic device" indicates a context related to a vehicle, which is determined by the electronic device 125 or the processor 210. "priority" indicates the order of a plurality of contexts to be processed when contexts related to the vehicle occur at the same time or when contexts related to the vehicle occur within a designated time interval.

According to various embodiments, the processor 210 may determine the order of the plurality of contexts to be processed, based on a database such as Table 2. According to various embodiments, the processor 210 may process the plurality of context based on the determined order of processing.

For example, the processor 210 may map, to the input device 110, a function related to the first context having a higher priority from among the first context and the second context. The processor 210 may detect a user input to the input device 110 to which the function related to the first context is mapped, and may perform processing indicated by the detected user input. After performing processing indicated by the user input to the input device 110 to which the function related to the first context is mapped, the processor 210 may map, to the input device 110, the function related to the second context having a priority lower than the first context. The processor 210 may detect a user input to the input device 110 to which the function related to the second context is mapped, and may perform processing indicated by the detected user input.

Figure 10:
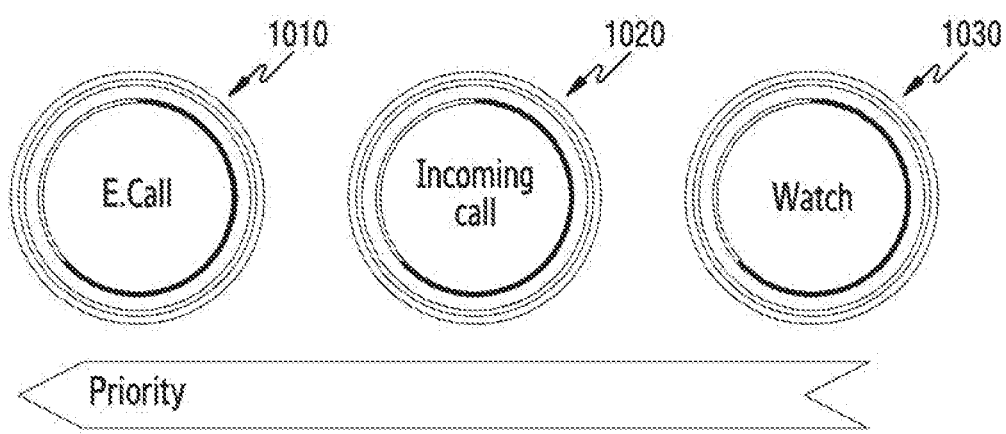
FIG. 10 is a diagram illustrating an example of a method of setting an input device based on a priority of a context related to a vehicle according to various embodiments of the disclosure.

FIG. 10 is a diagram illustrating an example of a method of setting an input device based on a priority of a context related to a vehicle according to various embodiments of the disclosure.

Referring to FIG. 10, the processor 210 may map, to the second input device 110-2 located closest to a user, a first function related to a first context having the highest priority from among the first to third contexts related to the vehicle, may map, to the third input device 110-3 located farthest from the user, a second function related to a second context having the lowest priority from among the first to third contexts related to the vehicle, and may map, to the first input device 110-1 located between the second input device 110-2 and the third input device 110-3, a third function related to the third context having a priority higher than the second context and lower than the first context from among the first to third contexts related to the vehicle. Based on the mapping, the processor 210 may display an indication 1010 for indicating sending an emergency call as the first function on a display of the second input device 110-2, may display an indication 1020 for indicating reception of an incoming call as the third function on a display of the first input device 110-1, and may display an indication 1030 for indicating provision of the current time as the second function on a display of the third input device 110-3. The mapping relationship between the above-described priority and an input device may be changed based on a design.

Figure 2B:
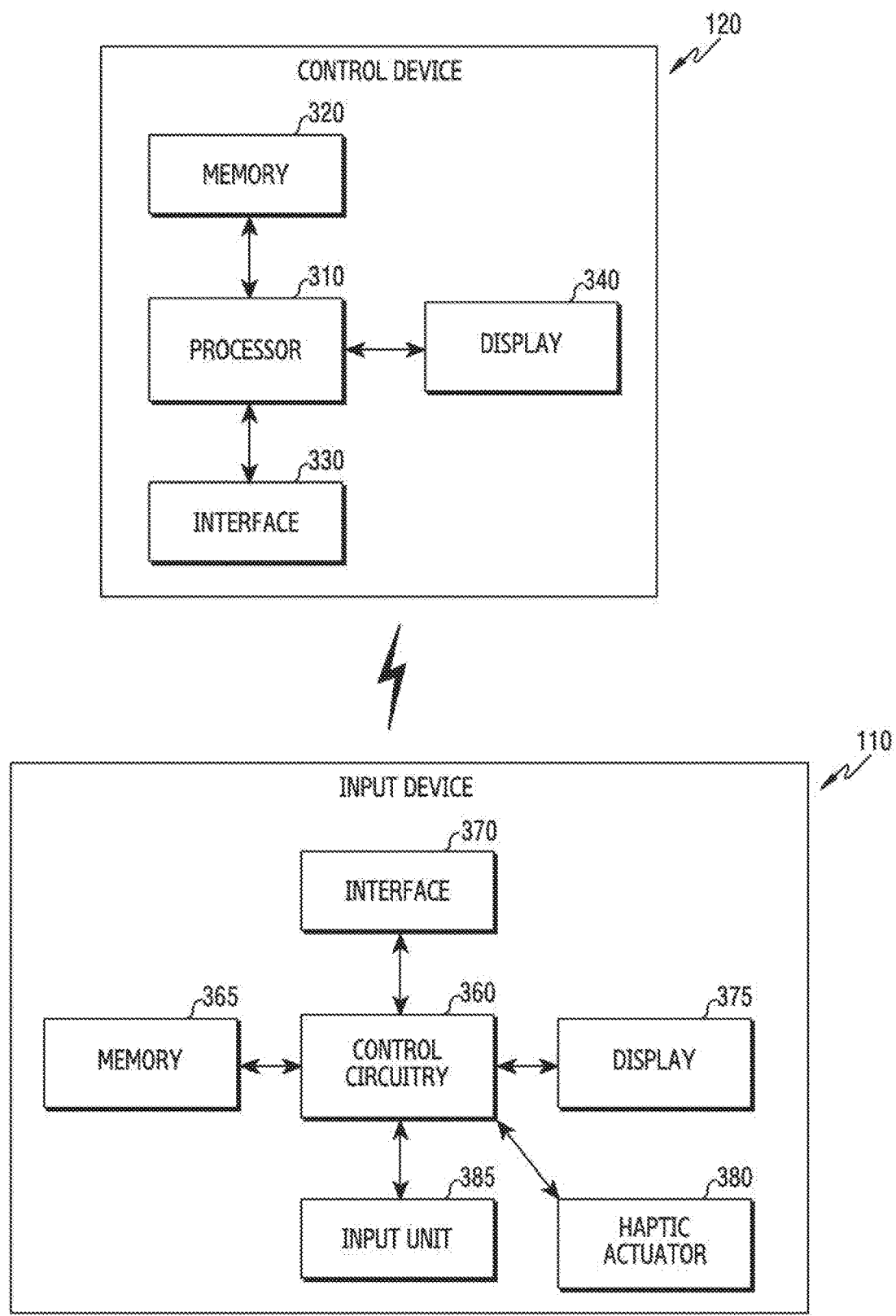
FIG. 2B is a diagram illustrating an example of a functional configuration of an electronic device and an input device according to various embodiments of the disclosure.

FIG. 2B is a diagram illustrating an example of the functional configuration of an electronic device and an input device according to various embodiments of the disclosure.

Referring to FIG. 2B, the control device 120 may include a processor 310, a memory 320, an interface 330, and the display 340.

The processor 310 may control the overall operation of the control device 120. The processor 310 may execute applications that provide advertisements, the internet, games, videos, and the like. According to various embodiments, the processor 310 may include a single processor core (single core), or may include multiple processor cores. For example, the processor 310 may include a multi-core such as a dual-core, a quad-core, a hexa-core, and the like. According to some embodiments, the processor 310 may further include a cache memory that is located inside or outside the processor 310.

The processor 310 may receive commands from other components of the control device 120, may interpret the received commands, and may execute calculation or process data based on the interpreted commands.

The processor 310 may process data or signals generated by an application. For example, the processor 310 may request instructions, data, or signals from the memory 320 so as to execute or control an application. The processor 310 may record (or store) instructions, data, or signals in the memory 320 so as to execute or control an application.

The processor 310 may interpret or process messages, data, instructions, or signals received from the memory 320, the interface 330, or the display 340. Also, the processor 310 may generate new messages, data, instructions, or signals based on received messages, data, instructions, or signals. The processor 310 may provide the generated or processed messages, data, instructions, or signals to the memory 320, the interface 330, the display 340, and the like.

A part or the whole of the processor 310 may be electrically or operably coupled with or connected to other components in the control device 120 (e.g., the memory 320, the interface 330, or the display 340).

According to embodiments, the processor 310 may include one or more processors. For example, the processor 310 may include an AP that controls an upper layer program such as an application program or the like, or a CP that executes control for communication.

The memory 320 may store instructions for controlling the control device 120, control instruction cords, control data, or user data. For example, the memory 320 may include an application, an OS, middleware, and a device driver.

The memory 320 may include one or more from among a volatile memory and a non-volatile memory. The volatile memory may include a DRAM, a SRAM, a SDRAM, a PRAM, a MRAM, a RRAM, a FeRAM, and the like. The non-volatile memory may include a ROM, a PROM, an EPROM, an EEPROM, a flash memory, and the like.

The memory 320 may include a non-volatile medium, such as a HDD, a SSD, an eMMC, and a UFS.

The interface 330 may be used to generate a communication path between another electronic device (e.g., an external electronic device or a device embedded in a vehicle) and the control device 120. The interface 330 may support a designated protocol for connection to another electronic device in a wired or wireless manner. For example, the interface 330 may include a module for at least one of a Bluetooth communication scheme, a BLE communication scheme, a Wi-Fi communication scheme, a cellular (or mobile) communication scheme, and a wired communication scheme. As another example, the interface 330 may include a HDMI, a USB interface, an SD card interface, or an audio interface which interoperates with (is in association with) a connection terminal, such as an HDMI connector, a USB connector, an SD card connector, or an audio connector (e.g., a headphone connector).

The interface 330 may provide the processor 310 with information or data received from the other electronic device via the communication path. The interface 330 may transmit, to the other electronic device, information or data provided from the processor 310 via the communication path.

The display 340 may output contents, data, or signals. According to various embodiments, the display 340 may display an image signal processed by the processor 310. For example, the display 340 may display a captured image or a still image. As another example, the display 340 may display a video or camera preview image. As another example, the display 340 may display a GUI so that a user interacts with the control device 120.

The display 340 may be configured with a LCD or an OLED.

According to embodiments, the display 340 may be configured with an integrated touch screen, by coupling to a sensor that is capable of receiving a touch input or the like.

The input device 110 may include a control circuit 360, a memory 365, an interface 370, a display 375, a haptic actuator 380, and an input unit 385.

The control circuit 360 may correspond to the processor 310.

The memory 365 may correspond to the memory 320. According to various embodiments, the memory 365 may store or temporarily store information received from the control device 120 via the interface 370.

The interface 370 may correspond to the interface 330. The display 375 may correspond to the display 340. According to embodiments, the display 375 may not be included in the input device 110. In other words, the display 375 may not be an essential component of the input device 110. The haptic actuator 380 may correspond to the haptic actuator 256 of FIG. 2A. The input unit 385 may correspond to the input unit 252 of FIG. 2A.

According to various embodiments, signaling between the input device 110 and the control device 120 may be performed in the same or similar manner as signaling between the input device 110 and the processor 210 of the electronic device 125 illustrated in FIG. 2A. In other words, signaling between the input device 110 and the control device 120 may correspond to signaling between the input device 110 and the processor 210 of the electronic device 125 illustrated in FIG. 2A.

An electronic device attachable to a vehicle according to various embodiments may include an interface, an input device including a display, and a processor. The processor is configured to perform: detecting that a context related to the vehicle corresponds to a first context based on first information received via the interface; in response to the detection that the context related to the vehicle corresponds to the first context, displaying, on the display, a first indication indicating a first function corresponding to the first context from among a plurality of functions of the vehicle, which are controllable by the input device; while displaying the first indication, detecting that the context related to the vehicle is changed from the first context to a second context based on second information received via the interface; and based on the detection that the context related to the vehicle is changed to the second context, displaying, on the display, a second indication which is changed from the first indication and indicates a second function corresponding to the second context from among the plurality of functions.

According to various embodiments, the input device may include: a housing including a first surface and the display exposed via at least a part of the first surface, and configured to detect a depression on at least a part of the first surface; and a rotatable structure mounted on at least a part of the first surface, and configured to enclose the display when the first surface is viewed from a top.

According to embodiments, the processor may be further configured to perform: detecting a rotational input on the rotatable structure while the second indication is displayed on the display; generating a signal for controlling the second function based on a degree of rotation of the rotatable structure rotated by the rotational input; and transmitting the generated signal to at least one component in the vehicle via the interface. According to an embodiment, the housing may further include a haptic actuator, and the processor may be further configured to provide a haptic effect based on the degree of rotation of the rotatable structure rotated by the rotational input, while detecting the rotational input. According to another, the processor may be further configured to display information associated with a degree of change in a state related to the second function based on the rotational input, together with the second indication, while detecting the rotational input.

According to other embodiments, the processor is further configured to perform: detecting a rotational input on the rotatable structure while displaying the second indication on the display; generating a signal for controlling the second function based on a direction in which the rotatable structure is rotated by the rotational input; and transmitting the generated signal to at least one component in the vehicle via the interface.

According to other embodiments, the electronic device may further include another display, and the processor is configured to perform: detecting a rotational input on the rotatable structure while displaying the second indication on the display; and further displaying information indicating a degree of rotation of the rotatable structure rotated by the rotational input, on the other display. According to embodiments, the information indicating the degree of rotation of the rotatable structure rotated by the rotational input is displayed in the representation of the input device, on the other display.

According to various embodiments, at least one of the first information and the second information is received via the interface from at least one sensor embedded in the vehicle, or is received via the interface from an external electronic device.

According to various embodiments, the electronic device may further include a memory, and the processor is configured to perform: in response to detecting that the context related to the vehicle is changed to the second context, identifying a priority of the first context and a priority of the second context based on a database including data associated with priorities of a plurality of contexts which are included in the memory and include the first context and the second context; and in response to identifying that the priority of the second context is higher than the priority of the first context, displaying the second indication which is changed from the first indication, on the display.

An input device attachable to a vehicle according to various above-described embodiments may include a housing including a first surface, a display exposed via at least a part of the first surface, and a control circuitry; and a rotatable structure mounted on at least a part of the first surface, and configured to enclose the display when the first surface is viewed from the top. The control circuitry is configured to perform: receiving, from a control device attached to the vehicle, configuration information including data indicating a function of the vehicle corresponding to a context related to the vehicle which is detected by the control device; mapping, to the input device, the function from among a plurality of functions controllable by the input device, based on the configuration information; and in response to detecting a rotational input on the rotatable structure in a state in which the function is mapped to the input device, transmitting, to the control device, information associated with the rotational input to the control device.

According to various embodiments, the control circuitry is further configured to perform: identifying, based on the configuration information, an indication for indicating the function from among a plurality of indications for indicating the plurality of functions via the display; displaying the indication on the display; and transmitting information associated with the rotational input to the control device based on the detection of the rotational input on the rotatable structure while displaying the indication.

According to various embodiments, the configuration information may further include data associated with a plurality of input values for the function, which are allocated based on a degree of rotation of the rotatable structure rotated by the rotational input, and the control circuitry is configured to perform: identifying a degree of rotation of the rotatable structure rotated by the rotational input, in response to the detection of the rotational input while displaying the indication; selecting an input value corresponding to the identified degree from among the plurality of input values; and transmitting, to the control device, information associated with the rotational input including data associated with the selected input value, wherein the selected input value is used by the control device, so as to change a state related to the function of the vehicle in the vehicle. According to embodiments, the input device may further include a haptic actuator, and the plurality of input values may include a first input value and a second input value subsequent to the first input value. The control circuitry may be further configured to provide a haptic effect via the haptic actuator so as to indicate that an input value indicated by the rotational input is changed from the first input value to the second input value while the rotatable structure is rotated by the rotational input.

According to embodiments, wherein the housing is configured to detect a depression on at least a part of the first surface, and is configured to transmit, to the control device, information associated with a rotational input in response to detecting the depression after detecting the rotational input on the rotatable structure while displaying the indication.

According to embodiments, the depression may be detected by a linear movement of the display, which is vertical to the first surface.

According to various embodiments, the control circuitry may be further configured to change at least a part of the indication which is displayed on the display based on a degree of rotation of the rotatable structure rotated by the rotational input. According to embodiments, the control circuitry may be further configured to restore at least a part of the changed indication, after transmitting information associated with the rotational input to the control device. According to an embodiment, the indication may include a first visual object provided in a shape for representing the function, and a second visual object provided in a shape for representing a degree of change, made by the rotational input, in a state related to the function. For example, the first visual object may be disposed in an area corresponding to the center of the indication, the second visual object may be disposed in an area corresponding to a boundary of the display, and at least a part of the second visual object may be highlighted based on a degree of rotation of the rotatable structure rotated by the rotational input, so as to represent a degree of change, made by the rotational input, in a state related to the function.

According to various embodiments, the rotatable structure may be configured in a ring shape including a plurality of grooves.

Figure 11:
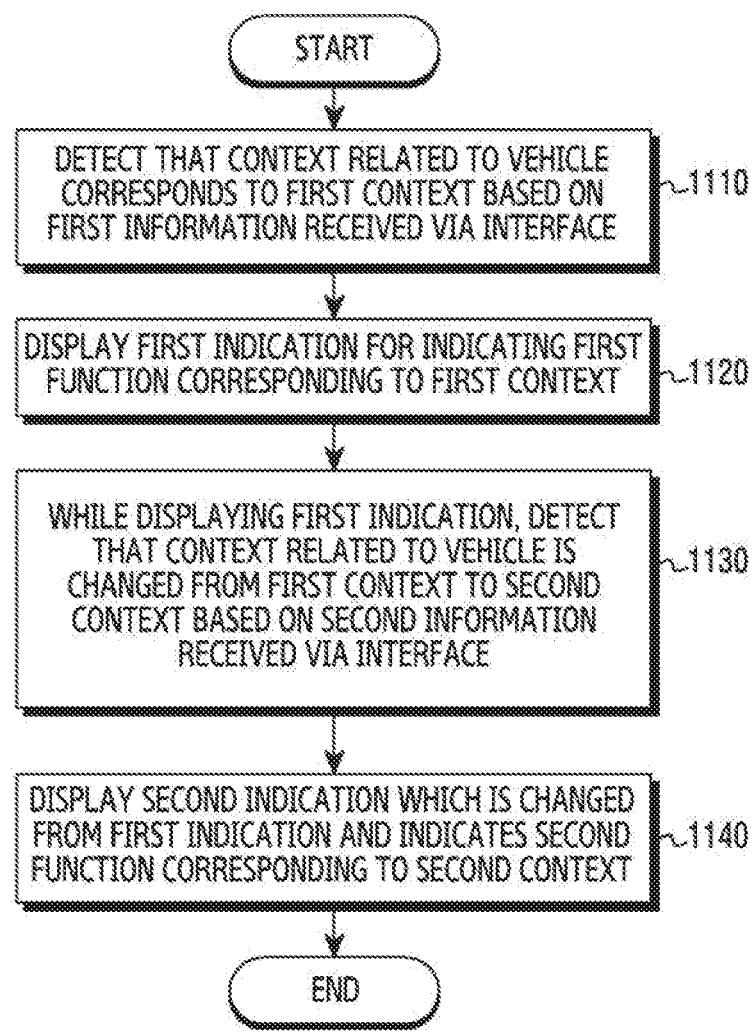
FIG. 11 is a diagram illustrating an example of the operation of an electronic device according to various embodiments of the disclosure.

FIG. 11 is a diagram illustrating an example of the operation of an electronic device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Referring to FIG. 11, in operation 1110, the processor 210 may detect that a context related to a vehicle corresponds to a first context based on first information received via the interface 230. For example, the processor 210 may detect that the context related to the vehicle corresponds to the first context from one or more from among a device embedded in the vehicle, an external electronic device located outside the vehicle, and another electronic device which is located in the vehicle and is related to the electronic device 125.

In operation 1120, the processor 210 may display a first indication for indicating a first function corresponding to the first context on the display 254 of the input device 110. For example, in response to detecting that the context related to the vehicle corresponds to the first context, the processor 210 may display, on the display 254, the first indication for indicating the first function corresponding to the first context from among a plurality of functions of the vehicle which are controllable by the input device 110. The input device 110 may include: a housing, which includes a first surface and the display 254 which is exposed via at least a part of the first surface and is configured to detect a depression on at least a part of the first surface; and a rotatable structure which is mounted on at least a part of the first surface and is configured to enclose the display when the first surface is viewed from the top.

In operation 1130, while the first indication is displayed, the processor 210 may detect that the context related to the vehicle is changed from the first context to a second context, based on second information received via the interface 230. For example, the processor 210 may detect that the context related to the vehicle is changed from the first context to the second context, from one or more from among a device embedded in the vehicle, an external electronic device located outside the vehicle, and another electronic device which is located in the vehicle and is related to the electronic device 125.

In operation 1140, based on detecting that the context related to the vehicle is changed to the second context, the processor 210 may display, on the display 254, a second indication which is changed from the first indication, and indicates a second function corresponding to the second context. For example, in response to detecting that the context related to the vehicle is changed to the second context, the processor 210 may display the second indication which is changed from the first indication. The second indication indicates the second function corresponding to the second context from among the plurality of functions which are controllable by the input device 110.

As described above, the processor 210 of the electronic device 125 according to various embodiments may detect a change of the context related to the vehicle where the electronic device 125 is located, based on information received via the interface 230, thereby adaptively changing a function of the input device. 110. By changing the function, the electronic device 125 according to various embodiments may provide intuitiveness, and may provide a service related to the vehicle via a simplified input.

Figure 12:
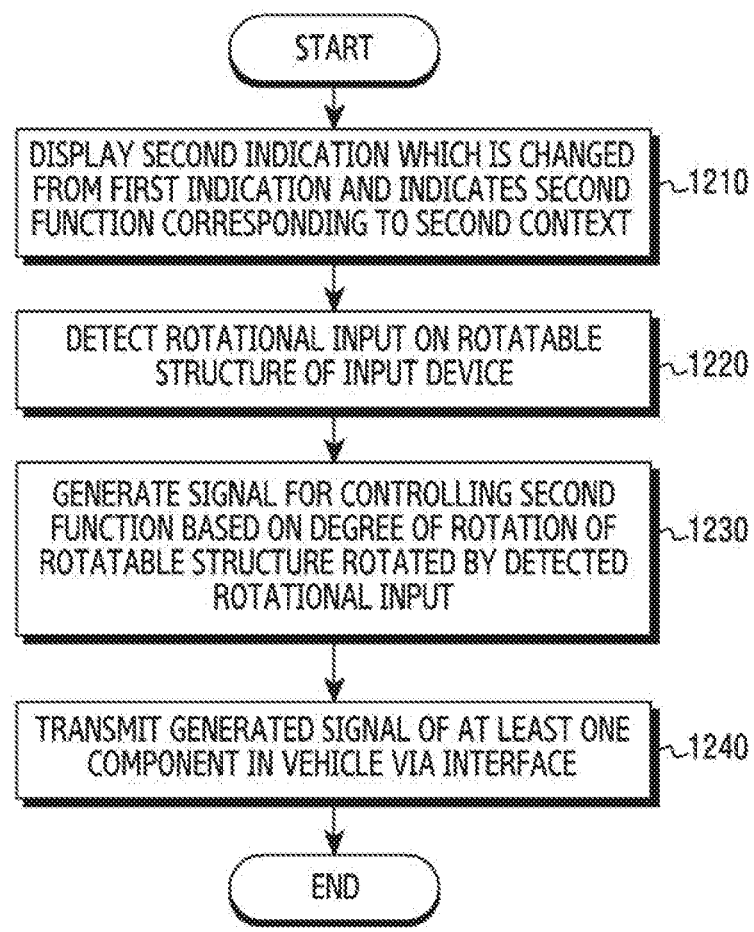
FIG. 12 is a diagram illustrating an example of an operation of an electronic device for processing an input to an input device according to various embodiments of the disclosure.

FIG. 12 is a diagram illustrating an example of an operation of an electronic device for processing an input to an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

In operations 1210 to 1240 of FIG. 12 may be related to operation 1140 of FIG. 11.

Referring to FIG. 12, in operation 1210, the processor 210 may display the second indication which is changed from the first indication, and indicates the second function corresponding to the second context.

In operation 1220, the processor 210 may detect a rotational input to the rotatable structure of the input device 110 while the second indication is displayed on the display 254. The rotational input may be caused by the physical force which is transferred from a user who grips the rotatable structure.

In operation 1230, the processor 210 may generate a signal for controlling the second function based on a degree of rotation of the rotatable structure rotated by the rotational input. For example, the processor 210 may obtain, from the input device 110, information for indicating the degree of rotation of the rotatable structure rotated by the rotational input. Based on the information, the processor 210 may determine a service corresponding to the degree of rotation of the rotatable structure rotated by the rotational input, from the plurality of services related to the second function. The processor 210 may generate a signal for controlling the second function based on the determined service.

In operation 1240, the processor 210 may transmit a signal for controlling the second function to at least one component in the vehicle via the interface 230. The at least one component may be a device embedded in the vehicle so as to provide the service related to the second function. For example, the at least one component may be a device for controlling a window of the vehicle, a device for controlling the air conditioner of the vehicle, or the like.

As described above, the processor 210 in the electronic device 125 according to various embodiments may generate and transmit a signal for controlling a function based on detection of a rotational input which is a simplified input, thereby providing a more intuitive vehicle control service.

Figure 13:
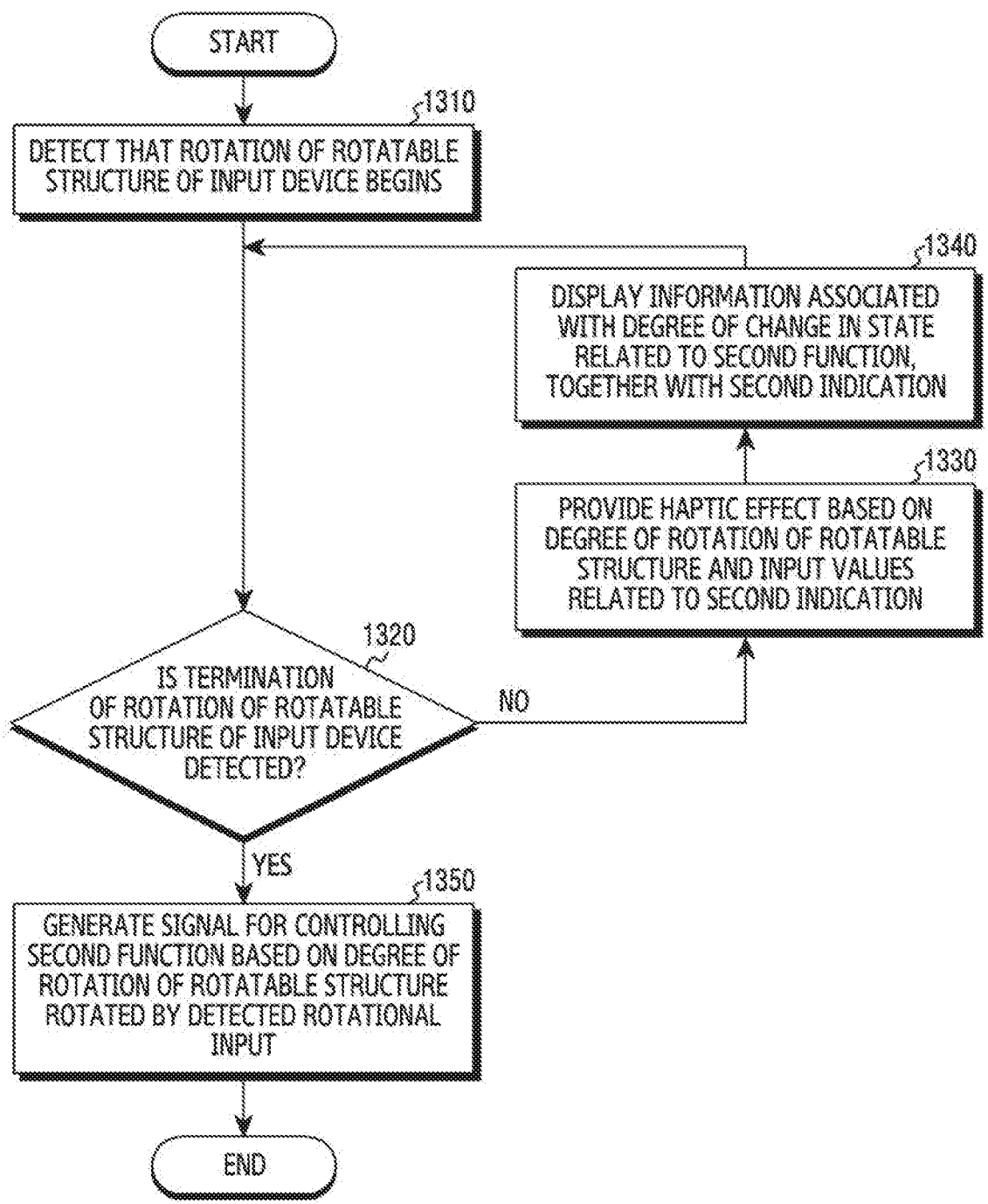
FIG. 13 is a diagram illustrating an example of an operation of an electronic device for controlling an input device according to various embodiments of the disclosure.

FIG. 13 is a diagram illustrating an example of an operation of an electronic device for controlling an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Operations 1310 to 1350 of FIG. 13 may be related to operation 1220 and operation 1230 of FIG. 12.

Referring to FIG. 13, in operation 1310, the processor 210 may detect that rotation of the rotatable structure of the input device 110 begins. The processor 210 may detect that the rotation of the rotatable structure begins based on information received from the input device 110.

In operation 1320, the processor 210 may monitor whether termination of the rotation of the rotatable structure of the input device 110 is detected in response to detecting that the rotation of the rotatable structure begins. Based on monitoring, when it is identified that the rotation of the rotatable structure is terminated, the processor 210 may proceed with operation 1350. Based on monitoring, when it is identified that the rotation of the rotatable structure is not terminated, the processor 210 may proceed with operations 1330 and 1340.

In operation 1330, the processor 210 may provide a haptic effect based on a degree of rotation of the rotatable structure and input values related to the second indication, in response to detecting that the rotation of the rotatable structure of the input device 110 is continued. The input values may be set to be similar to values in Table 1. For example, the input values may include a first input value and a second input value subsequent to the first input value. The processor 210 may provide the haptic effect via the haptic actuator 256 so as to indicate that an input value indicated by the rotational input is changed from the first input to the second input, in response to detecting that the rotation of the rotatable structure is changed from a first angle corresponding to the first input value to a second angle corresponding to the second input value.

In operation 1340, the processor 210 may display information associated with a degree of change in the state related to the second function, together with the second indication, in response to detecting that the rotation of the rotatable structure of the input device 110 is continued. For example, when the second function mapped to the input device 110 is a volume control function, the processor 210 may display information associated with the state of a volume that increases or decreases based on a degree of rotation of the rotatable structure of the input device 110, together with the second indication.

Operations 1330 and 1340 may be performed in parallel or may be performed in a reverse order, unlike the order illustrated in FIG. 13.

In operation 1350, the processor 210 may generate a signal for controlling the second function based on a degree of rotation of the rotatable structure rotated by the detected rotational input, in response to detecting that the rotation of the rotatable structure of the input device 110 is terminated.

As described above, the processor 210 of the electronic device 125 according to various embodiments may provide a user with more enhanced intuitiveness via a haptic effect and by changing the state of the display of the input device 110.

Figure 14:
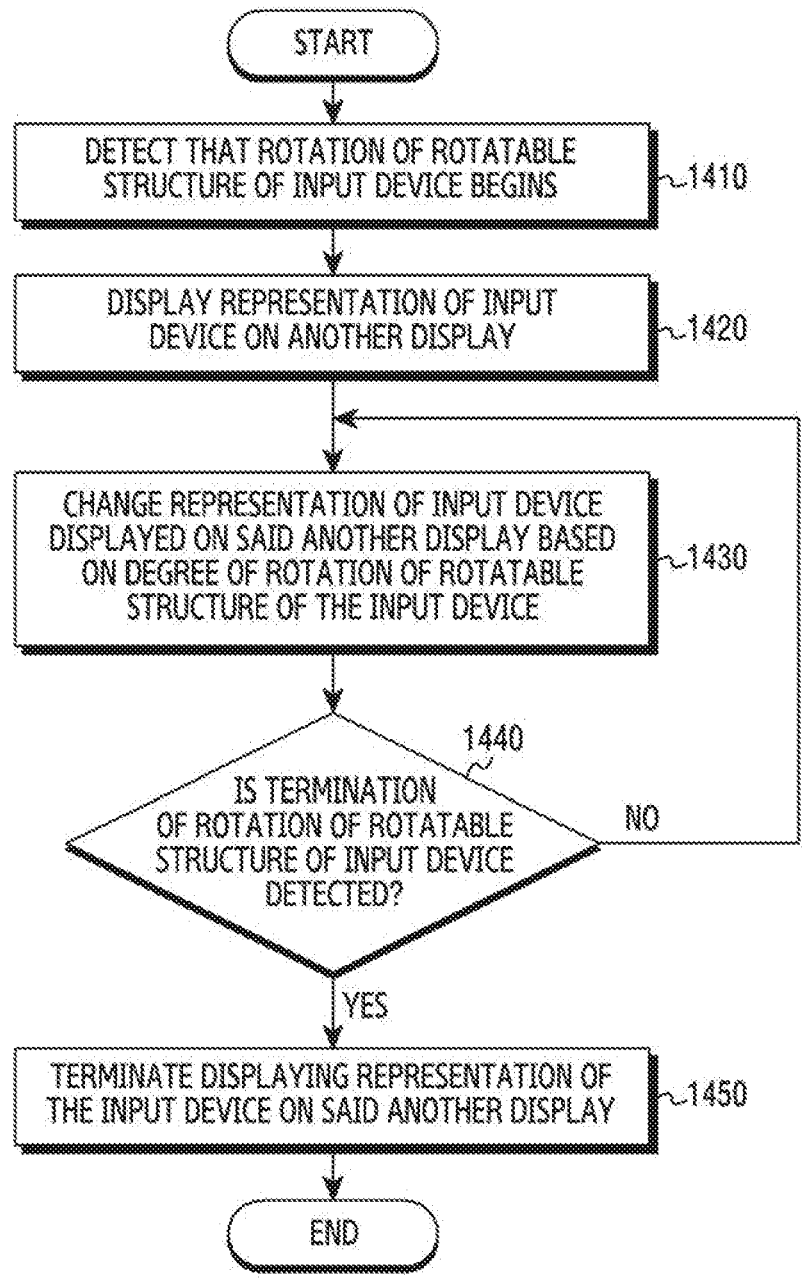
FIG. 14 is a diagram illustrating an example of an operation of an electronic device for providing guidance associated with information related to an input to an input device according to various embodiments of the disclosure.

FIG. 14 is a diagram illustrating an example of an operation of an electronic device for providing guidance associated with information related to an input to an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Operations 1410 to 1450 of FIG. 14 may be related to operation 1220 of FIG. 12.

Referring to FIG. 14, in operation 1410, the processor 210 may detect that rotation of the rotatable structure of the input device 110 begins.

In operation 1420, the processor 210 may display the representation of the input device 110 on another display (e.g., the display 240) in response to the detection. The representation of the input device 110 may be used for providing guidance associated with how a state related to the second function currently changes based on the rotational input to the input device 110.

In operation 1430, the processor 210 may change the representation of the input device 110 displayed on the other display based on a degree of rotation of the rotatable structure of the input device 110. For example, when the wind speed of the air conditioner of a vehicle is controlled via the input device 110, the processor 210 may change the wind speed of the air conditioner based on the degree of rotation of the rotatable structure in the representation of the input device 110 displayed on the other display.

In operation 1440, the processor 210 may identify whether termination of rotation of the rotatable structure is detected. When the termination of the rotation of the rotatable structure is detected, the processor 210 may proceed with operation 1450. Unlike the above, when rotation of the rotatable structure is continuously detected, the processor 210 may repeatedly perform operations 1430 and 1440.

In operation 1450, the processor 210 may terminate displaying the representation of the input device 110 on the other display. Based on detecting the termination of the rotation of the rotatable structure, the processor 210 may determine that controlling the second function using the input device 110 is completed. Based on the determination, the processor 210 may terminate displaying the representation of the input device 110.

As described above, the processor 210 of the electronic device 125 according to various embodiments may provide a user with intuitiveness by providing the representation of the input device 110 on another display. Also, the processor 210 may lead a user to concentrate on driving by provide the representation of the input device 110 via the other display.

Figure 15:
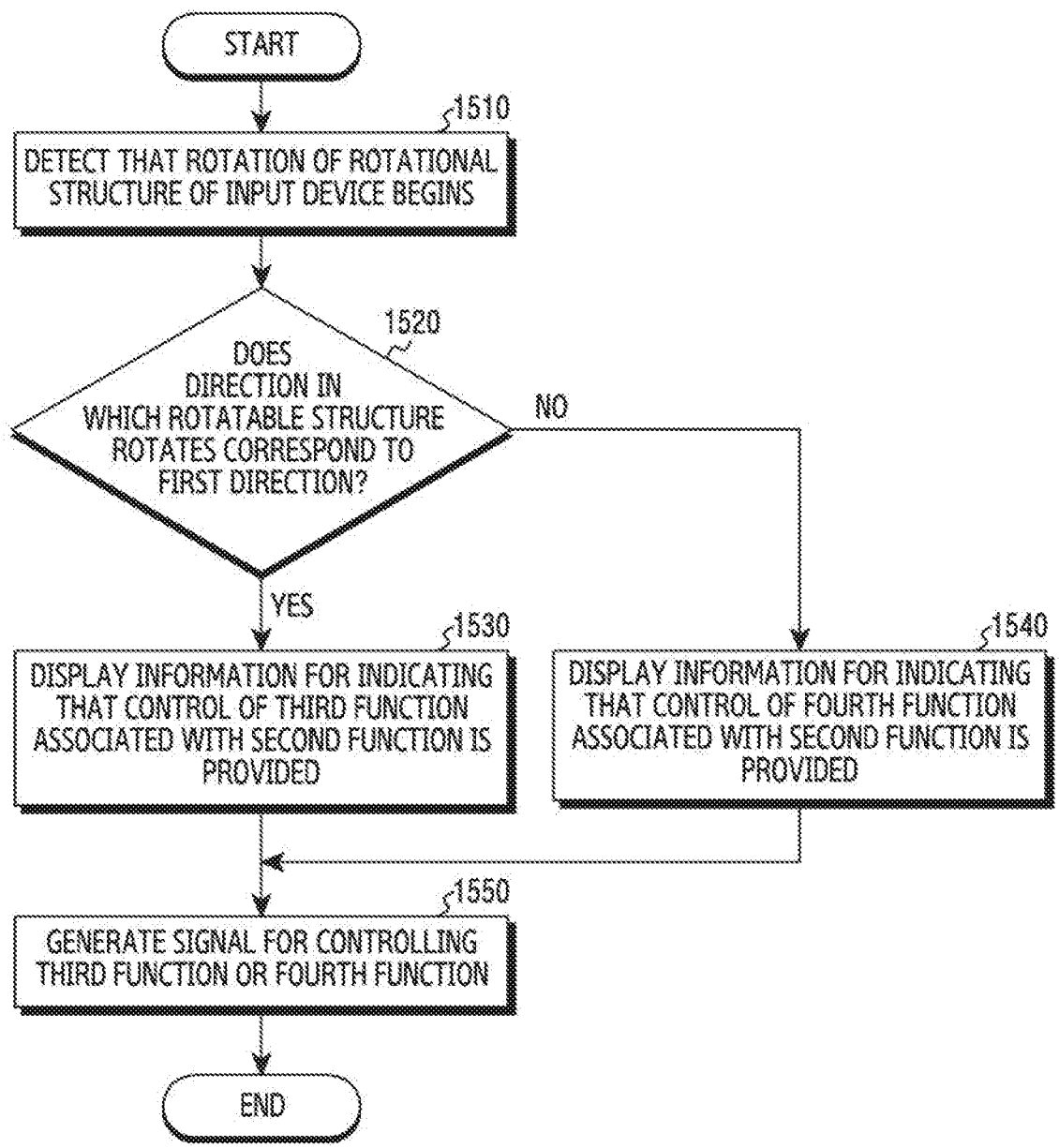
FIG. 15 is a diagram illustrating another example of an operation of an electronic device for processing an input to an input device according to various embodiments of the disclosure.

FIG. 15 is a diagram illustrating another example of an operation of an electronic device for processing an input to an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Operations 1510 to 1550 of FIG. 15 may be related to operation 1220 and operation 1230 of FIG. 12.

Referring to FIG. 15, in operation 1510, the processor 210 may detect that rotation of the rotatable structure of the input device 110 begins.

In operation 1520, the processor 210 may determine whether a direction in which the rotatable structure rotates corresponds to a first direction. The processor 210 may obtain information associated with the rotation direction from the input device 110. Based on the information associated with the rotation direction, the processor 210 may determine whether the direction in which the rotatable structure rotates corresponds to the first direction. When the rotation direction corresponds to the first direction, the processor 210 may proceed with operation 1530. Unlike the above, when the rotation direction corresponds to a second direction, the processor 210 may perform operation 1540.

In operation 1530, based on the determination that the rotation direction corresponds to the first direction, the processor 210 may display information for indicating that control of a third function associated with a second function is provided. For example, the processor 210 may determine accepting the connection of an incoming call (e.g., the third function) as processing the incoming call (e.g., the second function). Based on the determination, the processor 210 may display a screen showing that the incoming call is connected, as the information.

In operation 1540, based on the determination that the rotation direction corresponds to the second direction, the processor 210 may display information for indicating that control of a fourth function associated with the second function is provided. For example, the processor 210 may determine rejecting the connection of an incoming call (e.g., the fourth function) as processing the incoming call (e.g., the second function). Based on the determination, the processor 210 may display a screen indicating that the incoming call is rejected, as the information.

In operation 1550, the processor 210 may generate a signal for controlling the third function or the fourth function. In the above-described example, the processor 210 may control a smart phone interoperating with the electronic device 125 so as to connect the incoming call, or may control the smart phone so as to reject the incoming call.

As described above, the processor 210 of the electronic device 125 according to various embodiments may provide various functions based on the rotation direction of the rotatable structure, whereby the number of inputs required to perform a function may be reduced.

Figure 16:
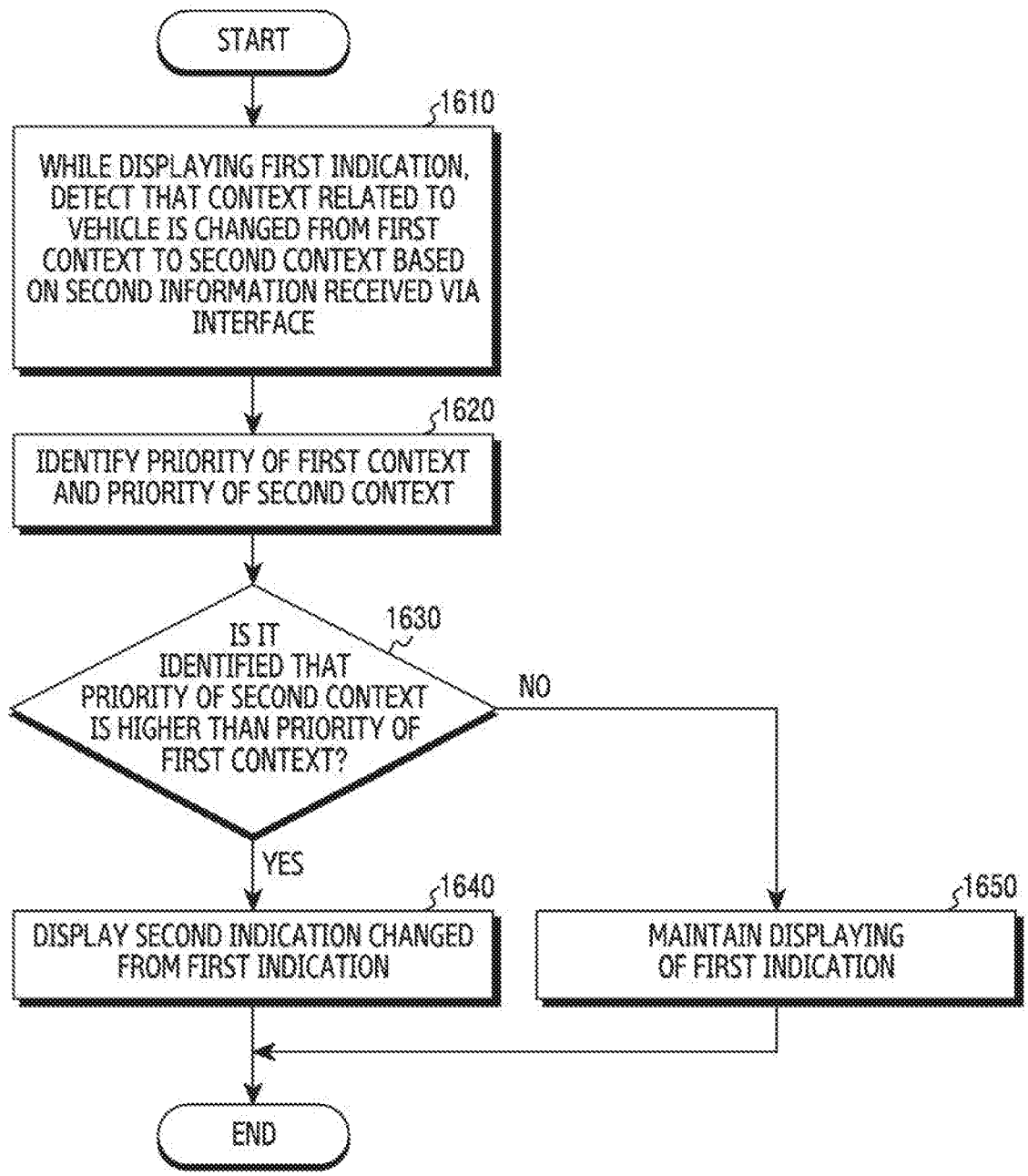
FIG. 16 is a diagram illustrating an example of an operation of an electronic device for controlling display of an indication based on a priority of a context related to a vehicle according to various embodiments of the disclosure.

FIG. 16 is a diagram illustrating an example of an operation of an electronic device for controlling display of an indication based on a priority of a context related to a vehicle according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Operations 1610 to 1650 of FIG. 16 may be related to operation 1130 and operation 1140 of FIG. 11.

Referring to FIG. 16, while the first indication is displayed, the processor 210 may detect that the context related to the vehicle is changed from the first context to the second context, based on the second information received via the interface 230, in operation 1610. The processor 210 may perform detection within a designated period of time after detecting the first context.

In operation 1620, the processor 210 may identify a priority of the first context and a priority of the second context. For example, based on a database configured as shown in Table 2, the processor 210 may identify the priority of the first context and the priority of the second context.

In operation 1630, the processor 210 may identify whether the priority of the second context is higher than the priority of the first context. When it is identified that the priority of the second context is higher than the priority of the first context, the processor 210 may proceed with operation 1640. Unlike the above, when it is identified that the priority of the second context is lower than the priority of the first context, the processor 210 may proceed with operation 1650.

In operation 1640, the processor 210 may display the second indication which is changed from the first indication on the display 254, based on the identification that the priority of the second context is higher than the priority of the first context.

In operation 1650, the processor 210 may maintain displaying of the first indication based on the identification that the priority of the second context is lower than the priority of the first context.

As described above, the processor 210 of the electronic device 125 according to various embodiments may process a plurality of contexts based on priorities, thereby mapping a function required by a user to the input device 110. Via mapping, the processor 210 may provide improved convenience within the vehicle.

Figure 17:
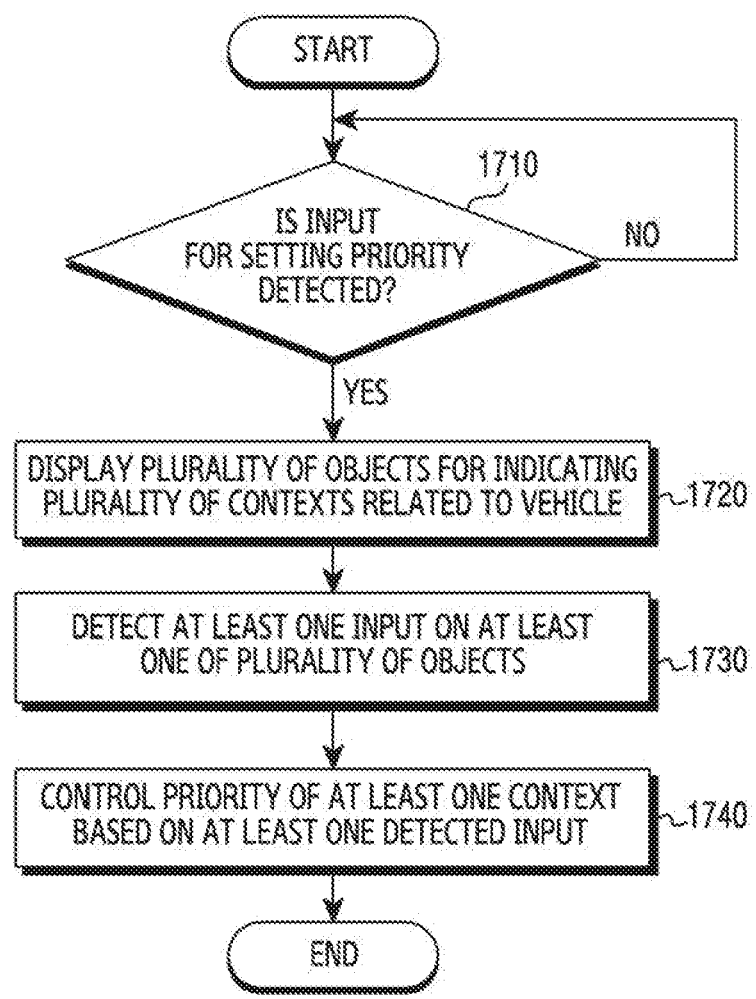
FIG. 17 is a diagram illustrating an example of an operation of an electronic device for setting a priority of a context according to various embodiments of the disclosure.

FIG. 17 is a diagram illustrating an example of an operation of an electronic device for setting a priority of a context according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Referring to FIG. 17, in operation 1710, the processor 210 may monitor whether an input for setting a priority is detected. The input may be received via the display 240, or may be received via another electronic device (e.g., a smart phone) interoperating with the electronic device 125.

In operation 1720, in response to the detection of the input, the processor 210 may display a plurality of objects for indicating a plurality of contexts related to the vehicle.

In operation 1730, the processor 210 may detect at least one input on at least one object from among the plurality of objects. The at least one input may be an input for setting a priority of a context indicated by the at least one object.

In operation 1740, the processor 210 may control the priority of the at least one context based on the at least one detected input. By controlling the priority, the processor 210 may configure or update the database as shown in Table 2.

As described above, the processor 210 of the control device 120 according to various embodiments may provide a user interface for setting a priority of each of the plurality of contexts related to the vehicle, thereby controlling the input device 110 to meet the user preference.

Figure 18:
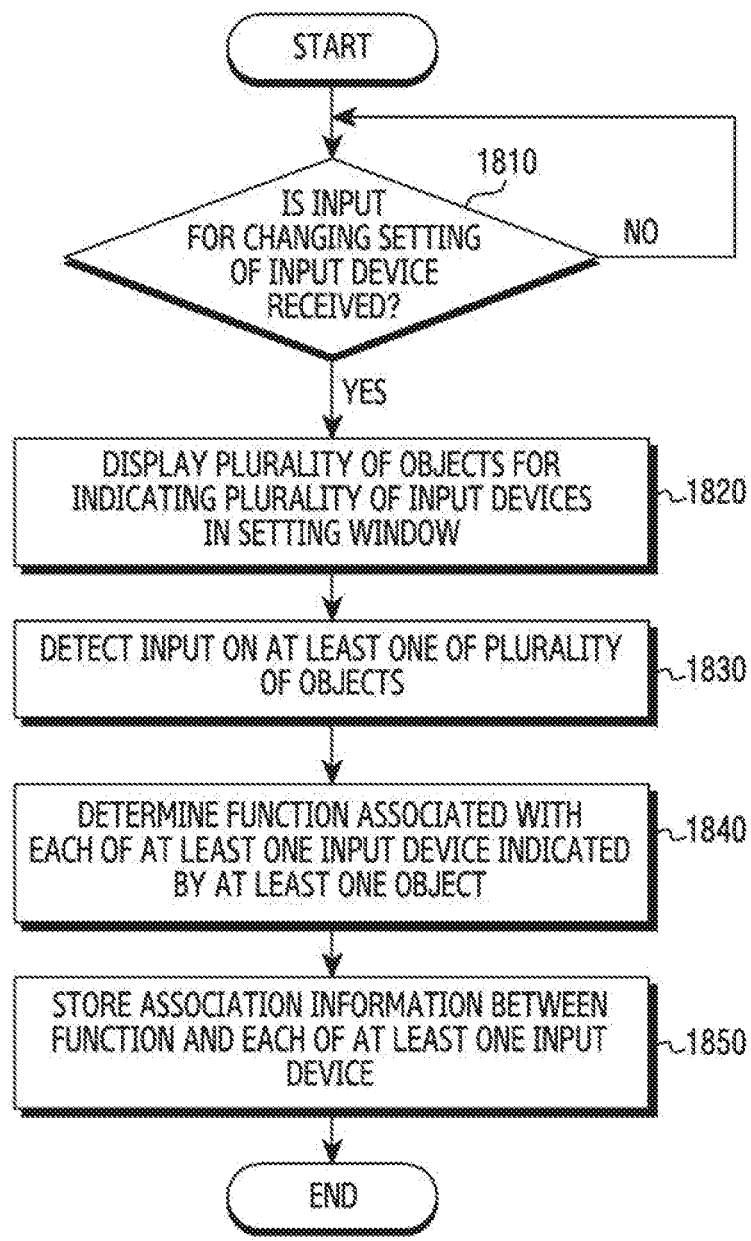
FIG. 18 is a diagram illustrating an example of an operation of an electronic device for changing a setting of an input device according to various embodiments of the disclosure.

FIG. 18 is a diagram illustrating an example of an operation of an electronic device for changing a setting of an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Referring to FIG. 18, in operation 1810, the processor 210 may monitor whether an input for changing a setting of the input device 110 is received.

In operation 1820, in response to the reception of the input for changing the setting of the input device 110, the processor 210 may display, in a setting window, a plurality of objects for indicating a plurality of input devices (e.g., the input device 110-1 to the input device 110-3 of FIG. 6) included in the vehicle. The setting window may be configured as shown in FIG. 8.

In operation 1830, the processor 210 may detect an input to at least one of the plurality of objects.

In operation 1840, the processor 210 may determine a function associated with each of the at least one input device indicated by the at least one object. For example, based on an input that drags and drops, on the at least one object, at least one of a plurality of icons indicating a plurality of functions that may be associated with each of the at least one input device, the processor 210 may determine a function associated with each of the at least one input device indicated by the at least one object.

In operation 1850, the processor 210 may store association information between each of the at least one input device and a function. The processor 210 may control each of the plurality of input devices based on the association information.

As described above, the processor 210 of the control device 120 according to various embodiments may provide a user interface for changing settings of the plurality of input devices, thereby providing an input device suitable for the user preference.

Figure 19:
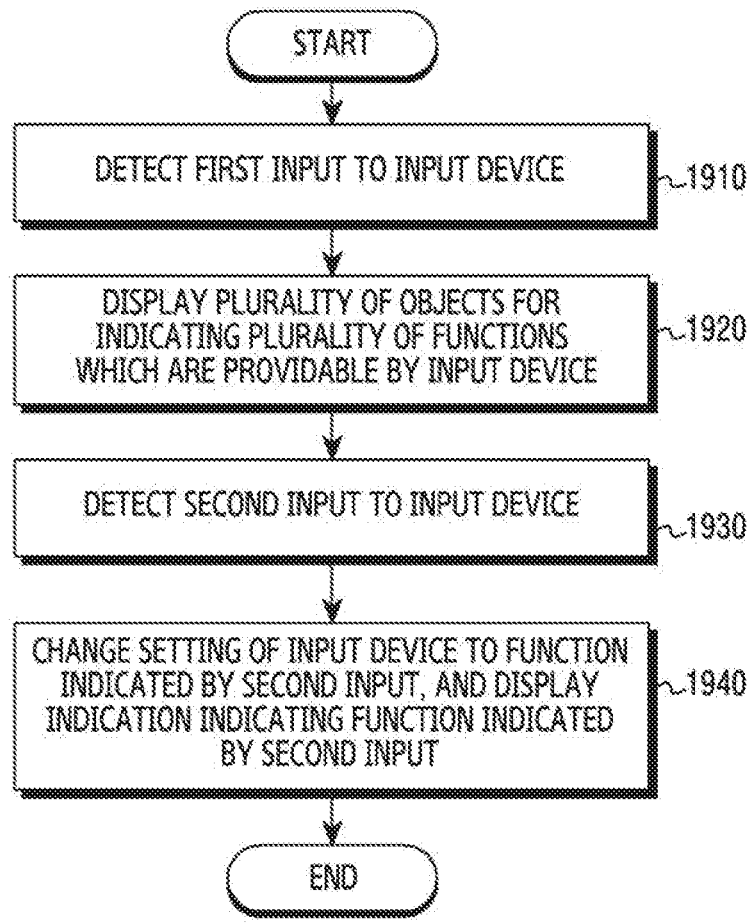
FIG. 19 is a diagram illustrating an example of an operation of an electronic device for selecting one of a plurality of functions using an input device according to various embodiments of the disclosure.

FIG. 19 is a diagram illustrating an example of an operation of an electronic device for selecting one of a plurality of functions using an input device according to various embodiments of the disclosure. The operation may be performed by the electronic device 125 of FIG. 2A, the control device 120 of FIG. 2B, the processor 210 of the electronic device 125 of FIG. 2A, or the processor 310 of the control device 120 of FIG. 2B.

Referring to FIG. 19, the processor 210 may detect a first input to the input device 110 in operation 1910. For example, the first input may be a depression on the housing of the input device 110.

In operation 1920, the processor 210 may display, on the display 254, a plurality of objects for indicating a plurality of functions which are controllable by the input device 110.

In operation 1930, the processor 210 may detect a second input to the input device 110 while the plurality of objects is displayed. The second input may be a rotational input to the rotatable structure of the input device 110.

In operation 1940, the processor 210 may change a setting of the input device 110 to a function indicated by the second input, and may display an indication indicating the function indicated by the second input.

As described above, the processor 210 according to various embodiments may provide guidance associated with selecting various functions using an input device, thereby providing more improved convenience.

Figure 20:
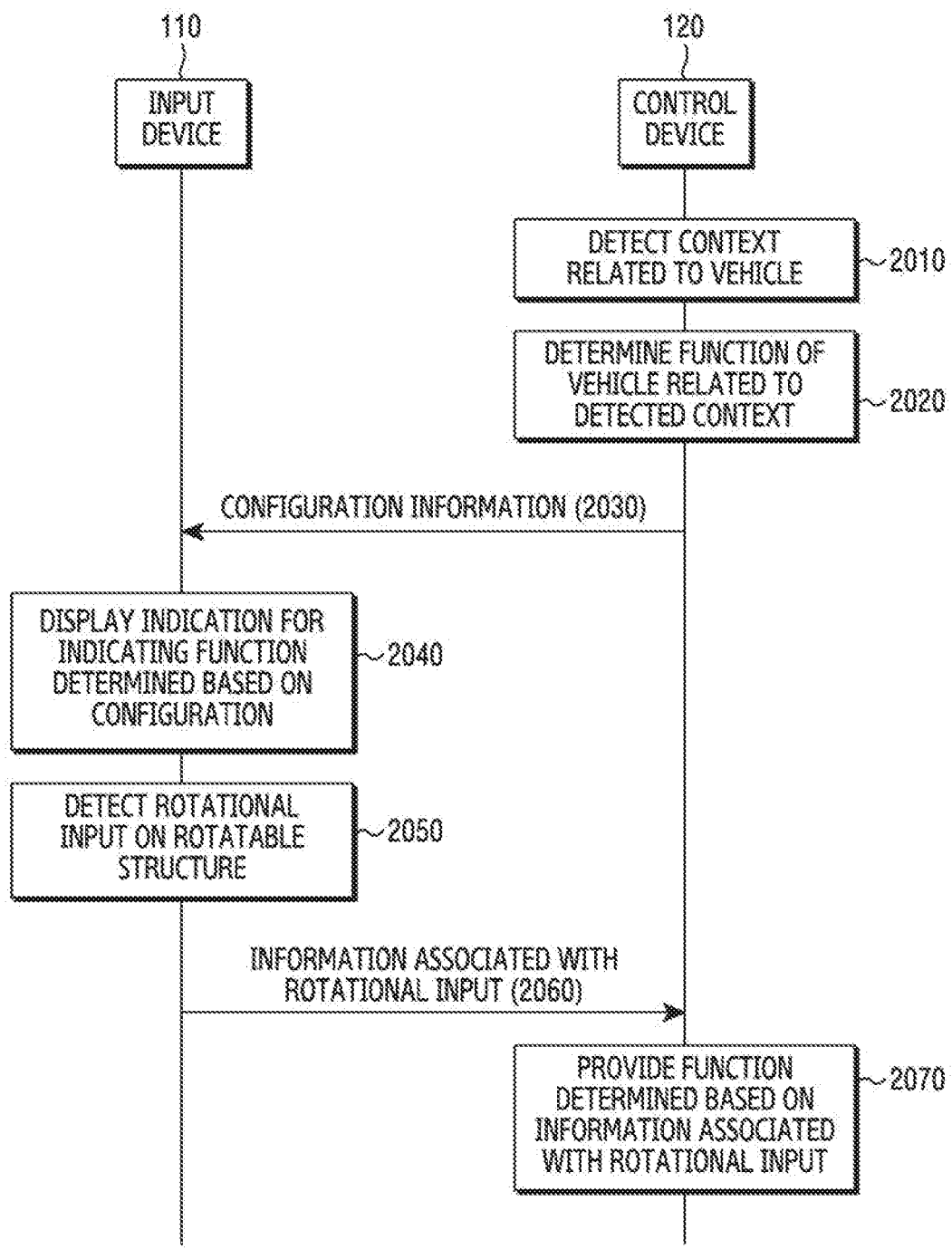
FIG. 20 is a diagram illustrating an example of signaling performed between an electronic device and an input device according to various embodiments of the disclosure.

FIG. 20 is a diagram illustrating an example of signaling performed between an electronic device and an input device according to various embodiments of the disclosure. The signaling may be caused between the control device 120 and the input device 110 of FIG. 2B.

Referring to FIG. 20, in operation 2010, the control device 120 (e.g., the control device 120) may detect a context related to a vehicle. The control device 120 may detect the context related to the vehicle based at least on information received from an external electronic device, information received from a device located in a vehicle, or information used by the control device 120.

In operation 2020, the control device 120 may determine a function of the vehicle, which is related to the detected context.

In operation 2030, the control device 120 may transmit configuration information. For example, the control device 120 may generate or determine the configuration information corresponding to the function. The control device 120 may transmit the configuration information to the input device 110. The input device 110 may receive the configuration information.

In operation 2040, the input device 110 may display, on the display 375, an indication for representing a function determined based on configuration information.

In operation 2050, the input device 110 may detect a rotational input to the rotatable structure while the indication is displayed.

In operation 2060, the input device 110 may transmit information associated with the rotational input to the control device 120 in response to the detection of the rotational input. The control device 120 may receive the information associated with the rotational input.

In operation 2070, in the vehicle, the control device 120 may provide a function determined based on the information associated with the rotational input.

As described above, the input device 110 according to various embodiments may service functions in the vehicle using a simplified input such as a rotational input, thereby providing improved convenience. The control device 120 according to various embodiments may map a function of the vehicle to the input device 110 based on a context related to the vehicle, thereby providing improved convenience.

A method of an electronic device according to various above-described embodiments may include: detecting that a context related to a vehicle corresponds to a first context based on first information received via an interface of the electronic device; in response to detecting that the context related to the vehicle corresponds to the first context, displaying, on a display of an input device, a first indication indicating a first function corresponding to the first context from among a plurality of functions of the vehicle, which are controllable by the input device; while displaying the first indication, detecting that the context related to the vehicle is changed from the first context to a second context based on second information received via the interface; and based on the detection that the context related to the vehicle is changed to the second context, displaying, on the display, a second indication which is changed from the first indication and indicates a second function corresponding to the second context from among the plurality of functions.

According to various embodiments, the input device may include: a housing including a first surface and the display exposed via at least a part of the first surface, and configured to detect a depression on at least a part of the first surface; and a rotatable structure mounted on at least a part of the first surface, and configured to enclose the display when the first surface is viewed from a top.

According to embodiments, the method may further include: detecting a rotational input on the rotatable structure while the second indication is displayed on the display; generating a signal for controlling the second function based on a degree of rotation of the rotatable structure rotated by the rotational input; and transmitting the generated signal to at least one component in the vehicle via the interface. According to an embodiment, the housing may further include a haptic actuator, and the method may further include providing a haptic effect based on the degree of rotation of the rotatable structure rotated by the rotational input, while detecting the rotational input. According to embodiments, the method may further include displaying information associated with a degree of change in a state related to the second function based on the rotational input, together with the second indication, while detecting the rotational input.

According to other embodiments, the method may further include: detecting a rotational input on the rotatable structure while displaying the second indication on the display; generating a signal for controlling the second function based on a direction in which the rotatable structure is rotated by the rotational input; and transmitting the generated signal to at least one component in the vehicle via the interface.

According to other embodiments, the method may further include: detecting a rotational input on the rotatable structure while displaying the second indication on the display; and displaying information indicating a degree of rotation of the rotatable structure rotated by the rotational input, on the other display. According to embodiments, the information indicating the degree of rotation of the rotatable structure rotated by the rotational input is displayed in representation of the input device, on the other display.

According to various embodiments, at least one of the first information and the second information is received via the interface from at least one sensor embedded in the vehicle, or is received via the interface from an external electronic device.

According to various embodiments, the operation of detecting that the context related to vehicle is changed from the first context to the second context may include: identifying a priority of the first context and a priority of the second context based on a database including data associated with priorities of a plurality of contexts which are included in the memory and include the first context and the second context, in response to detecting that the context related to the vehicle is changed to the second context; and the operation of displaying the second indication may include: displaying the second indication which is changed from the first indication, on the display, in response to identifying that the priority of the second context is higher than the priority of the first context.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a ROM, an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and equivalents thereof

What is claimed is:

1. An electronic device attachable to a vehicle, the electronic device comprising:
    an interface configured to generate a communication path between the electronic device and an external electronic device or the vehicle;
    an input device comprising a display; and
    a processor,
    wherein the processor is configured to:
        receive information via the interface from at least one sensor or the external electronic device,
        determine a context of the vehicle based on the information,
        in response to determining the context of the vehicle, determine a function corresponding to the context of the vehicle from among a plurality of functions of the vehicle, and
        display, on the display, an indication related to the determined function.

2. The electronic device of claim 1, wherein the input device further comprises:
    a housing comprising a first surface, the display being exposed via at least a part of the first surface, the housing being configured to detect a depression on at least a part of the first surface; and
    a rotatable structure mounted on at least a portion of the first surface, the rotatable structure being configured to enclose the display in a case that the first surface is viewed from above.

3. The electronic device of claim 2, wherein the processor is further configured to:
    detect a rotational input on the rotatable structure while the indication is displayed on the display,
    generate a signal for controlling the function based on a degree of rotation of the rotatable structure rotated by the rotational input, and
    control to transmit the signal to at least one component in the vehicle via the communication path.

4. The electronic device of claim 3,
    wherein the housing further comprises a haptic actuator, and
    wherein the processor is further configured to, while detecting the rotational input, provide a haptic effect based on the degree of rotation of the rotatable structure rotated by the rotational input.

5. The electronic device of claim 3, wherein the processor is further configured to, while detecting the rotational input, control to display, on the display, information, which is associated with a degree of change in a state related to the function based on the rotational input, together with the indication.

6. The electronic device of claim 2, wherein the processor is further configured to:

detect a rotational input on the rotatable structure while displaying the indication on the display, generate a signal for controlling the function based on a direction in which the rotatable structure is rotated by the rotational input, and control to transmit the signal to at least one component in the vehicle via the interface.

7. The electronic device of claim 2, further comprising: another display, wherein the processor is further configured to:
  detect a rotational input on the rotatable structure while displaying the indication on the display, and
  control the other display to display information indicating a degree of rotation of the rotatable structure rotated by the rotational input.

8. The electronic device of claim 7, wherein the information indicating the degree of rotation of the rotatable structure rotated by the rotational input is displayed in a representation of the input device, on the other display.

9. The electronic device of claim 1, further comprising: a memory, wherein the processor is further configured to:
  in response to detecting that the context of the vehicle is changed to another context, identify a priority of the context and a priority of the other context based on a database including data associated with priorities of a plurality of contexts which are included in the memory and include the context and the other context, and
  in response to identifying that the priority of the other context is higher than the priority of the context, control to display, on the display, another indication corresponding to the other context.

10. An input device attachable to a vehicle, the input device comprising:

a housing comprising:
  a first surface;
  a display exposed via at least a part of the first surface; and
  control circuitry; and a rotatable structure mounted on at least a portion of the first surface, the rotatable structure being configured to enclose the display in a case that the first surface is viewed from above, wherein the control circuitry is configured to:
  receive, from a control device attached to the vehicle, configuration information including data indicating a function of the vehicle corresponding to a context of the vehicle, the context of the vehicle being detected by the control device, the control device detecting the context of the vehicle based on a signal received via a communication path between the control device and an external device,
  map, to the input device, the function from among a plurality of functions controllable by the input device, based on the configuration information, and
  in response to detecting a rotational input on the rotatable structure in a state in which the function is mapped to the input device, control to transmit, to the control device, information associated with the rotational input.

11. The input device of claim 10, wherein the control circuitry is further configured to:
  identify, based on the configuration information, an indication for indicating the function from among a plurality of indications for indicating the plurality of functions via the display,
  control to display the indication on the display, and
  control to transmit the information associated with the rotational input to the control device based on the detection of the rotational input on the rotatable structure while displaying the indication.

12. The input device of claim 11,
wherein the configuration information further comprises data associated with a plurality of input values for the function, the plurality of input values for the function being allocated based on a degree of rotation of the rotatable structure rotated by the rotational input,
wherein the control circuitry is further configured to:
  in response to detecting the rotational input while displaying the indication, identify the degree of rotation of the rotatable structure rotated by the rotational input,
  select an input value corresponding to the identified degree of rotation from among the plurality of input values, and
  control to transmit, to the control device, the information associated with the rotational input, the information including data associated with the selected input value, and
wherein the selected input value is used by the control device to change a state related to the function of the vehicle in the vehicle.

13. The input device of claim 11,
wherein the housing is configured to detect a depression on at least a region of the first surface, and
wherein the control circuitry is further configured to, in response to detecting the depression after detecting the rotational input on the rotatable structure while displaying the indication, control to transmit, to the control device, the information associated with the rotational input.

14. The input device of claim 13, wherein the depression is detected by a linear movement of the display, the linear movement being vertical to the first surface.

15. The input device of claim 11, wherein the control circuitry is further configured to change at least a part of the indication which is displayed on the display based on a degree of rotation of the rotatable structure rotated by the rotational input.

16. The input device of claim 15, wherein the control circuitry is further configured to, after transmitting the information associated with the rotational input to the control device, restore at least a part of the changed indication.

17. The input device of claim 15, wherein the indication includes a first visual object, which is provided in a shape for representing the function, and a second visual object provided in a shape for representing a degree of change, made by the rotational input, in a state related to the function.

18. The input device of claim 17,
wherein the first visual object is disposed in an area corresponding to a center of the indication,
wherein the second visual object is disposed in an area corresponding to a boundary of the display, and
wherein at least a part of the second visual object is highlighted based on the degree of rotation of the rotatable structure rotated by the rotational input, the part of the second visual object being highlighted representing the degree of change, made by the rotational input, in a state related to the function.

19. The input device of claim 10, wherein the rotatable structure is configured in a ring shape comprising a plurality of grooves.

20. The input device of claim 19, wherein the rotatable structure is configured into a plurality of angle ranges, each angle range associated with a separate function.

* * * * *